(12) United States Patent
Bailey

(10) Patent No.: US 12,313,236 B2
(45) Date of Patent: May 27, 2025

(54) VEHICLE LIGHT SYSTEM

(71) Applicant: Autosystems, a division of Magna Exteriors Inc., Aurora (CA)

(72) Inventor: Edward Bailey, Rochester Hills, MI (US)

(73) Assignee: Autosystems, a division of Magna Exteriors Inc., Aurora (CA)

( * ) Notice: Subject to any disclaimer, the term of this patent is extended or adjusted under 35 U.S.C. 154(b) by 0 days.

(21) Appl. No.: 18/514,035

(22) Filed: Nov. 20, 2023

(65) Prior Publication Data

US 2024/0167659 A1 May 23, 2024

Related U.S. Application Data

(60) Provisional application No. 63/427,363, filed on Nov. 22, 2022.

(51) Int. Cl.
*F21S 43/00* (2018.01)
*B60Q 1/50* (2006.01)
*F21S 43/14* (2018.01)
*F21V 19/00* (2006.01)
*B60L 53/16* (2019.01)

(52) U.S. Cl.
CPC .............. *F21S 43/14* (2018.01); *B60Q 1/543* (2022.05); *F21V 19/0015* (2013.01); *B60L 53/16* (2019.02); *B60Q 1/5035* (2022.05)

(58) Field of Classification Search
CPC ....... F21V 19/0015; B60Q 1/543; F21S 43/14
See application file for complete search history.

(56) References Cited

U.S. PATENT DOCUMENTS

| | | | | |
|---|---|---|---|---|
| 9,796,325 B2* | 10/2017 | Salter | ...................... | F21S 43/14 |
| 10,281,113 B1* | 5/2019 | Salter | .................... | B60R 19/483 |
| 10,672,327 B1* | 6/2020 | Hinchman | ............... | B60Q 3/14 |
| 11,263,836 B1* | 3/2022 | Badger, II | ............ | G07C 5/0825 |
| 2010/0026238 A1* | 2/2010 | Suzuki | ...................... | B60Q 3/30 |
| | | | | 320/109 |
| 2017/0253174 A1* | 9/2017 | Hook | .................... | B60Q 1/2661 |
| 2017/0267117 A1* | 9/2017 | Grider | ..................... | B60L 58/12 |
| 2021/0086650 A1* | 3/2021 | Wang | ..................... | B60K 35/80 |
| 2021/0288455 A1* | 9/2021 | Stack | ....................... | B60L 53/16 |
| 2021/0300265 A1* | 9/2021 | Piccin | .................... | B60K 35/10 |
| 2022/0242265 A1* | 8/2022 | Gerstadt | ............... | B60L 53/665 |
| 2023/0056752 A1* | 2/2023 | Bailey | ..................... | H01L 33/60 |
| 2023/0103181 A1* | 3/2023 | Kim | ........................ | H05B 47/20 |
| | | | | 340/425.5 |

* cited by examiner

*Primary Examiner* — Gerald J Sufleta, II
(74) *Attorney, Agent, or Firm* — Dority & Manning, P.A.

(57) ABSTRACT

A vehicle light system can include an LED display. An intermediate can be layer positioned along the LED display. A vehicle charge port door can include a panel and a decorative layer. The decorative layer can be positioned between the intermediate layer and the panel. The decorative layer can define one or more channels therethrough.

17 Claims, 26 Drawing Sheets

| flexible LED PCB material stack | Th (mm) | Element |
|---|---|---|
| silicone | 0.085 | 44 |
| solder mask | 0.025 | 58 |
| LED flip chip on sapphire | 0.09 | 16 |
| solder high reliability | 0.025 | 54 |
| ImAu plating | 0.0008 | 50 |
| EN plating | 0.0026 | 52 |
| 1/3 - 1oz Cu | 0.0175 | 48 |
| Polyimide | 0.015 | 56 |
| Aluminum | 0.6 | 46 |

FIG. 3A

| flexible LED PCB material stack | Th (mm) | Element |
|---|---|---|
| silicone | 0.085 | 44 |
| solder mask | 0.025 | 58 |
| LED flip chip on sapphire | 0.09 | 16 |
| solder high reliability | 0.025 | 54 |
| ImAu plating | 0.0008 | 50 |
| EN plating | 0.0026 | 52 |
| 1/3 - 1oz Cu | 0.0175 | 48 |
| Ceramic filled FR4/CEM3 | 0.015 | 46 |
| 1/3 - 1oz Cu | 0.0175 | 78 |
| solder mask | 0.025 | 86 |

FIG. 4A

VEHICLE LIGHT SYSTEM

CROSS-REFERENCE TO RELATED APPLICATION

The present application claims priority to U.S. Provisional Patent Application Ser. No. 63/427,363, filed on Nov. 22, 2022, the contents of which are hereby incorporated by reference in their entirety.

FIELD

The present disclosure relates to flexible LED displays that may be implemented on or within a vehicle.

BACKGROUND

A vehicle may include various displays therein and/or thereon. Each display may be capable of providing information and/or creating aesthetic features.

BRIEF DESCRIPTION

Aspects and advantages of the technology will be set forth in part in the following description, or may be obvious from the description, or may be learned through practice of the technology.

In some aspects, the present subject matter is directed to a vehicle light system that includes an LED display. An intermediate layer is positioned along the LED display. A vehicle charge port door includes a panel and a decorative layer. The decorative layer is positioned between the intermediate layer and the panel. The decorative layer defines one or more channels therethrough.

In some aspects, the present subject matter is directed to a method for manufacturing a vehicle light system. The method includes producing an LED display. The method also includes disposing a decorative layer on a surface of a panel. In addition, the method includes forming one or more channels through the decorative layer. Lastly, the method includes operably coupling an opposing side of the decorative layer from the panel to the LED display.

In some aspects, the present subject matter is directed to a vehicle light system that includes an LED display. An intermediate layer is positioned along the LED display. A decorative layer is positioned on an opposing side of the intermediate layer from the LED display. The decorative layer defines one or more channels therethrough. A light transmissive panel is positioned on an opposing side of the decorative layer from the intermediate layer. A power assembly has at least a portion thereof that is operably coupled with the panel. A power supply is operably coupled with the power assembly and configured to power the LED display.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 3A is a table showing possible thickness measurements of the LED display in accordance with various aspects of the present disclosure;

FIG. 4A is a table showing possible thickness measurements of the LED display in accordance with various aspects of the present disclosure;

Figure 1A:
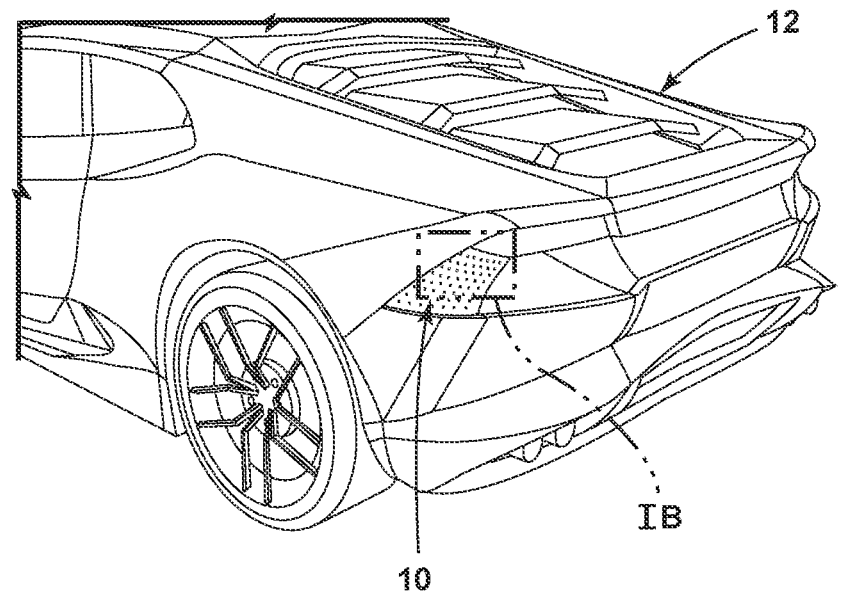
FIGS. 1A-1G illustrate a vehicle light system configured as a rear taillight in accordance with various aspects of the present disclosure.
Figure 1B:
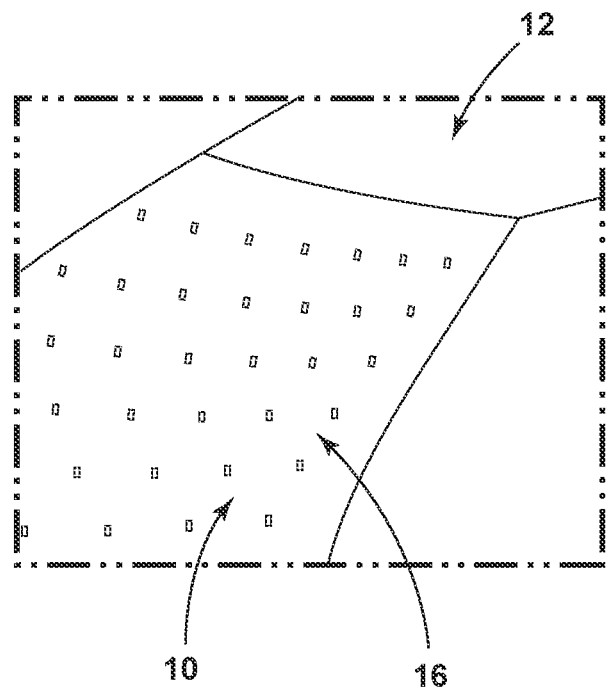
Figure 1C:
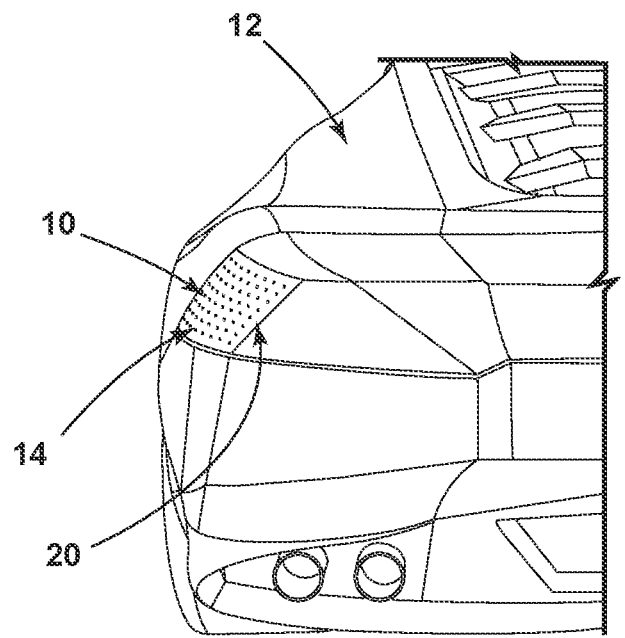
Figure 1D:
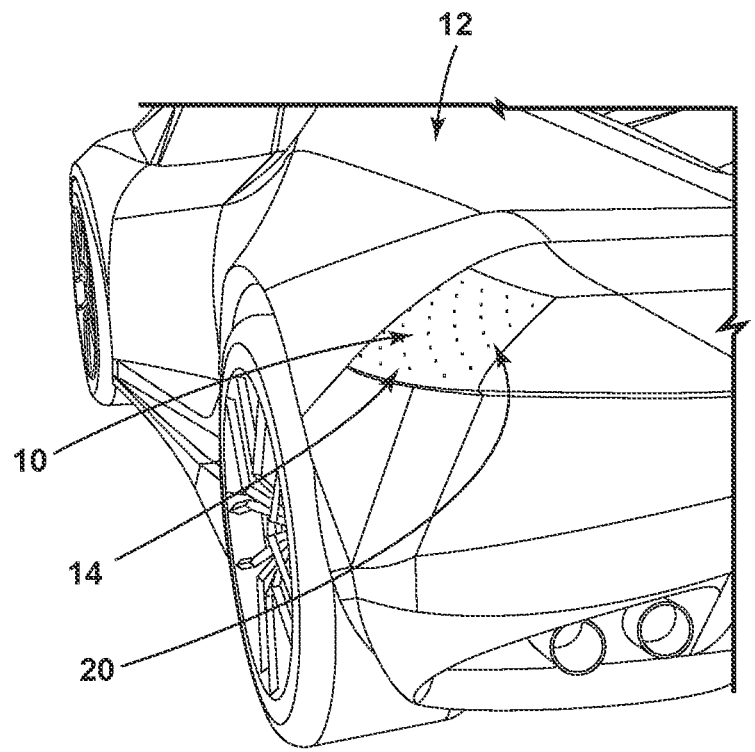
Figure 1E:
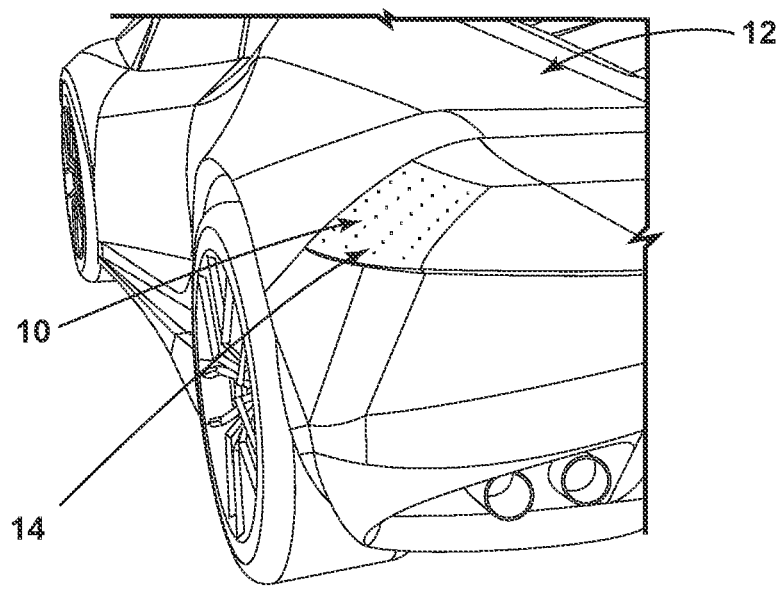
Figure 1F:
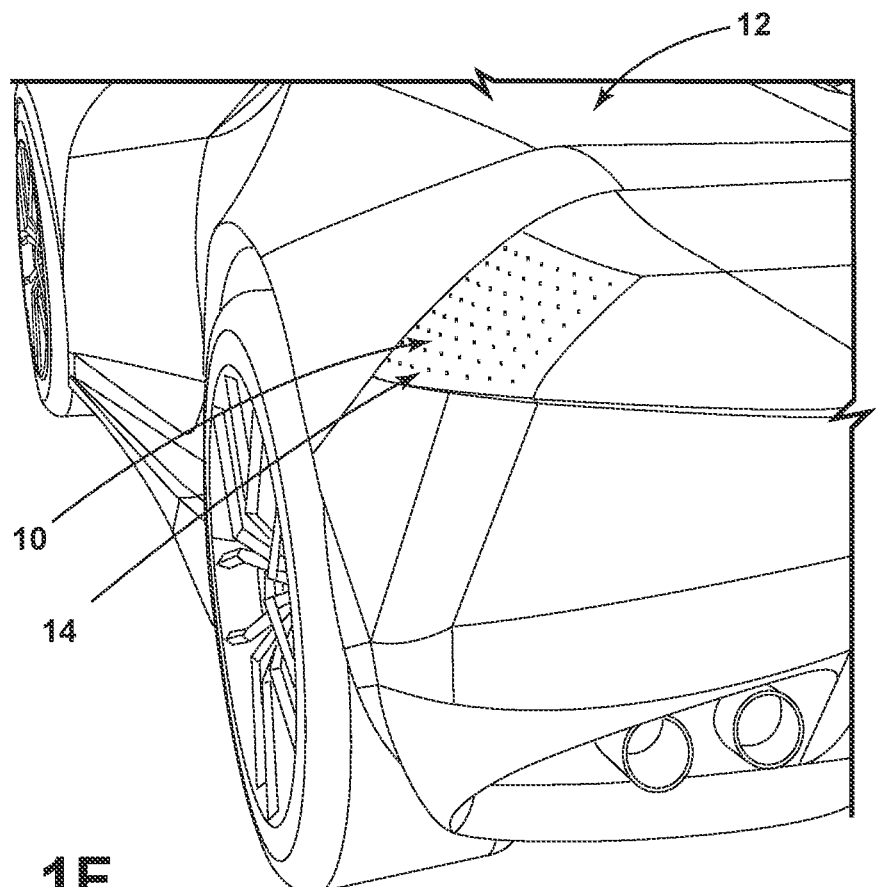
Figure 1G:
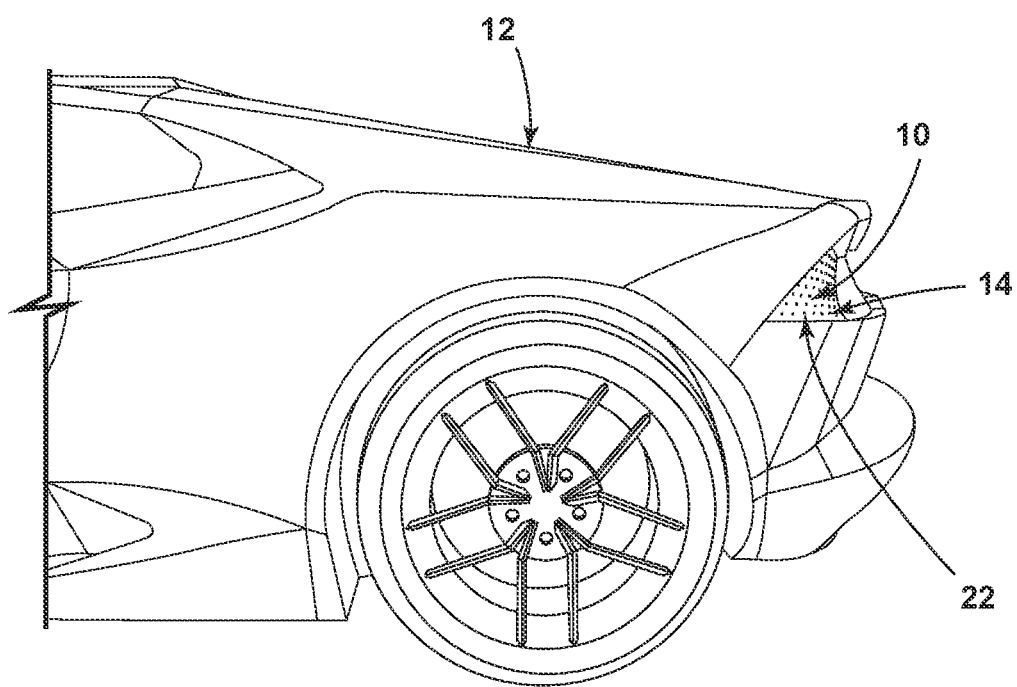

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the disclosure, not a limitation of the disclosure. In fact, it will be apparent to those skilled in the art that various modifications and variations can be made in the present disclosure without departing from the scope or spirit of the disclosure. For instance, features illustrated or described can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The term "selectively" refers to a component's ability to operate in various states (e.g., an ON state and an OFF state) based on manual and/or automatic control of the component.

As used herein, an "x-direction" corresponds to a length (e.g., a long dimension) of a LED chip, a "y-direction" corresponds to a width of a LED chip, and a z-direction corresponds to a vertical distance from a LED chip. In addition, "pitch" corresponds to a chip-to-chip distance between two LED chips in one of their x-direction and their y-direction.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to an LED display. The LED display can be positioned on an external portion (or an internal portion) of the vehicle and flexed in one or more axes. In some instances, the LED display can produce graphics, safety signaling, and/or pictograms for messaging through one or LED chips positioned on a printed circuit board (PCB). In various examples, the pitch of the LED chip locations can be as tight as 0.2 millimeters (mm) or less and as large as 4 mm (or larger) depending on the desired resolution and size of the LED chip. In various instances, the LED chips can be between 2 μm and 500 μm in either micro or mini-chip form with flip-chip electrodes, which can adhere directly or indirectly to the PCB. It will be appreciated that the distinction currently made between micro and mini-chip LED's is that the construction of the LED chip in which "micro" will refers to includes an LED that is less than 100 μm dimension on a side with the LED substrate usually removed by through a laser lift off (LLO) process, by utilizing ultraviolet (UV) excimer lasers with peak wavelength at 193 nm or 248 nm wavelength, and/or through any other process.

In some examples, an intermediate layer can be positioned along the LED display. The intermediate layer may be configured as a light-altering layer, which may be in the form of a diffuser, a light filter, a tint, and/or any other material.

A vehicle charge port door can include a panel and a decorative layer. The decorative layer can be positioned between the intermediate layer and the panel. In various examples, the decorative layer defines one or more channels therethrough. As such, light emitted from the LED display may transmit at a B-side of the charge port door through the one or more channels such that the light is visible from an A-side of the charge port door. In several examples, the light emitted from the LED display can produce graphics, safety signaling, and/or pictograms for messaging that are visible from the A-side of the charge port door while the LED display may be generally concealed behind the charge port door. Additionally or alternatively, the LED display can be operably coupled with any other substrate or structure of the vehicle while flexed in one or more axes without departing from the teachings provided herein.

FIGS. 1A-2F depict various examples of a vehicle light system 10 positioned on a vehicle 12 in accordance with various aspects of the present disclosure. The light system 10 can include a flexible LED display 14 having one or more LED chips 16 that can adhere to a flexible PCB 18 in patterns that can produce graphics, safety signaling, and/or pictograms for messaging. The PCB 18 described herein can be flexed unidirectionally along the long axis or short axis, or in a slight twist.

As shown in FIGS. 1A-1G, the LED display 14 can be positioned on an external portion (or an internal portion) of the vehicle 12 and flexed in two axes to enable both rearward facing light 20 as well as side emission light 22. In some instances, the LED display 14 can emit waves of light propagating from one portion of the LED display 14 to another portion. These transitions can be programmed with each LED addressable for electric excitation or grouped in zones. For example, the LED display 14 can electrify distinct LED chips 16 or pixels vertically allowing for sweeping transition or turn signal animation representing a change in direction of the vehicle 12. In various examples, the intensity of the light can be greater than or equal to 80 candelas (cd), and colors for signaling can be amber, yellow to orange-red, and deep red at 650 nm. Additionally or alternatively, the LED display 14 can dim the electrified LED chips 16 to produce a defined position taillight intensity, which may be between 2-20 cd for a low-intensity glow for safety purposes. In some examples, with a larger 4.0 mm pitch, the lines or peaks of the waves can be visible and distinct, however, in other examples, with a pitch of 0.2 mm, the LED display 14 can become contiguous as viewed by the resolution of the human eye which is approximately 60 cycles/deg of a field of view (FOV). In some cases, when the LED display 14 has a pixel pitch of about 0.2 mm, or between 0.1 mm and 0.4 mm, is that composite red, green, and blue (RGB) pixels comprised of physical LED's can mix color to produce composite hues of cyan with a mix of blue and green, magenta by mixing red and blue, and/or yellow with mixing red and green. In some instances, the mixing fidelity or purity of the composite colors can be improved by close placement or proximity of the RGB pixels on the LED chip 16.

As shown in FIGS. 2A-2F, the light system 10 may be implemented within a charger assembly 24 of the vehicle 12 in instances in which the vehicle 12 is configured as a battery-electric vehicle (BEV). However, it will be understood that the concepts described herein are not limited to BEVs and could extend to other vehicles, including other plug-in vehicles such as plug-in hybrid electric vehicles (PHEVs) and/or internal combustion engine vehicles. Therefore, although not shown in this embodiment, the vehicle 12 could be equipped with an internal combustion engine that can be employed either alone or in combination with other energy sources to propel the vehicle 12.

In various examples, the charger assembly 24 can periodically charge cells of a battery 26 within the vehicle 12. The charger assembly 24 may be connected to an external power source, such as an electrical grid, for receiving and distributing power to the cells. In various examples, the charger assembly 24 can include a support structure 28 operably supporting one or more charging ports 30. The one or more charging ports 30 are adapted to selectively receive power from the external power source, such as from a power cable connected to the external power source, and then distribute the power to the battery 26 for charging the cells.

The charging system can further include a charge port door 32 that is configured to selectively open to expose the charging port 30 and close to cover the charging port 30. In FIG. 2B, the charge port door 32 is illustrated in the closed position and, in FIG. 2C, the charge port door 32 is illustrated in the open position. The charge port door 32 can be mounted to a body 34 of the vehicle 12 and/or the support structure 28 by a hinge 36 and can be configured to rotate between the open and closed positions. While the charge port door 32 is rotatable between the closed position and the open position in the illustrated example, it will be appreciated that the charge port door 32 may move between the closed position and the open position in any manner without departing from the scope of the present disclosure.

As shown in FIGS. 2B-2F, the LED display 14 may be operably coupled with the charge port door 32. In some cases, the LED display 14 may be positioned at least partially within an LED housing 38 that may be operably coupled with a B-side 40 of the charge port door 32. In such instances, the light emitted from the LED display 14 may be transmitted through at least a portion of the charge port door 32 to be visible from the exterior of the vehicle 12 (e.g., the A-side 42 of the charge port door 32) when the charge port door 32 is in the open position and the closed position. Additionally or alternatively, the light emitted from the LED display 14 may be visible through the LED housing 38 when the charge port door 32 is in the open position. It will be appreciated, however, that the LED display 14 may be operably coupled with any other portion of the charging system without departing from the teachings provided herein.

Figure 2A:
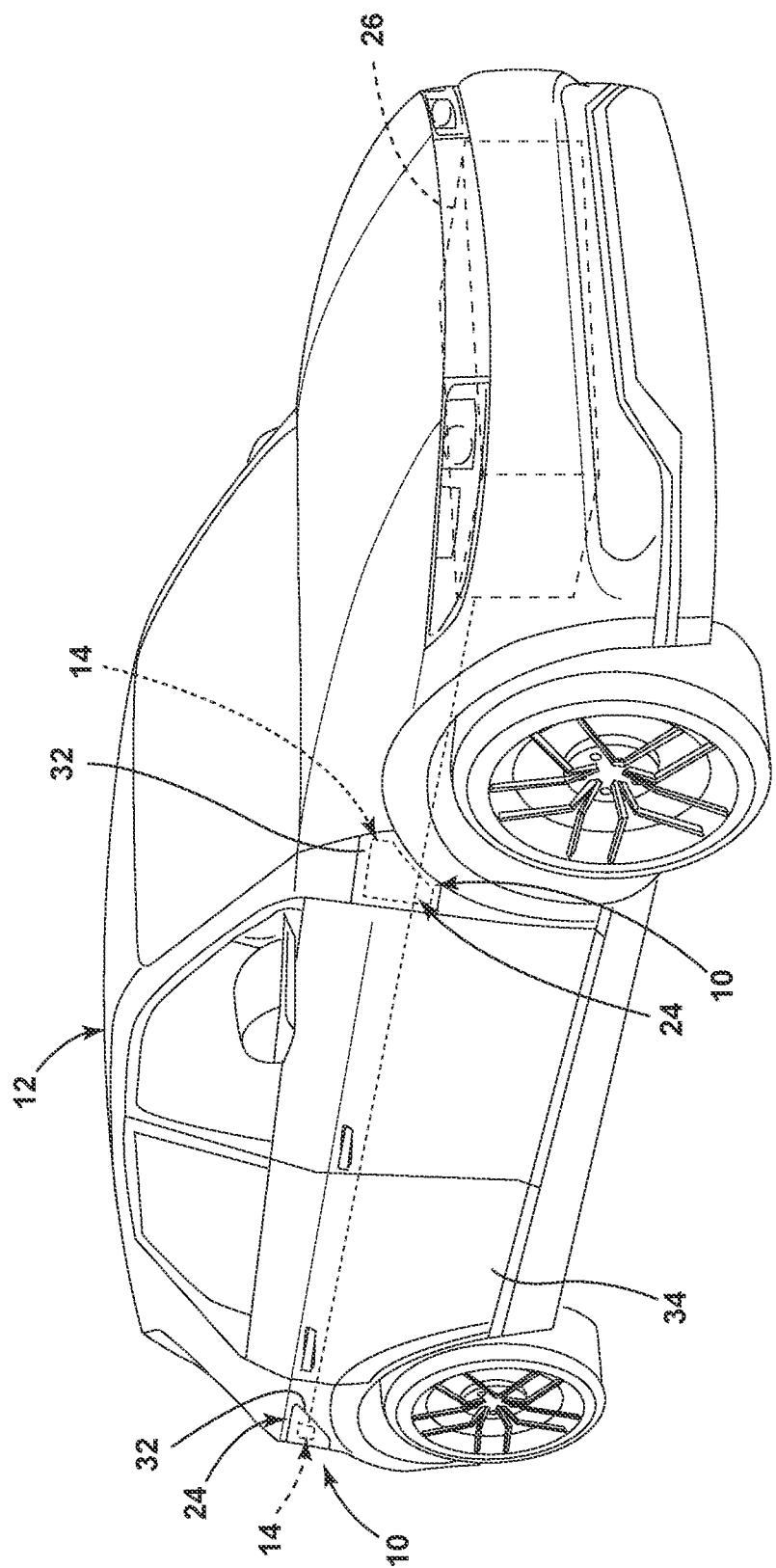
FIGS. 2A-2J illustrate the vehicle light system implemented within charging systems in accordance with various aspects of the present disclosure.
Figure 2B:
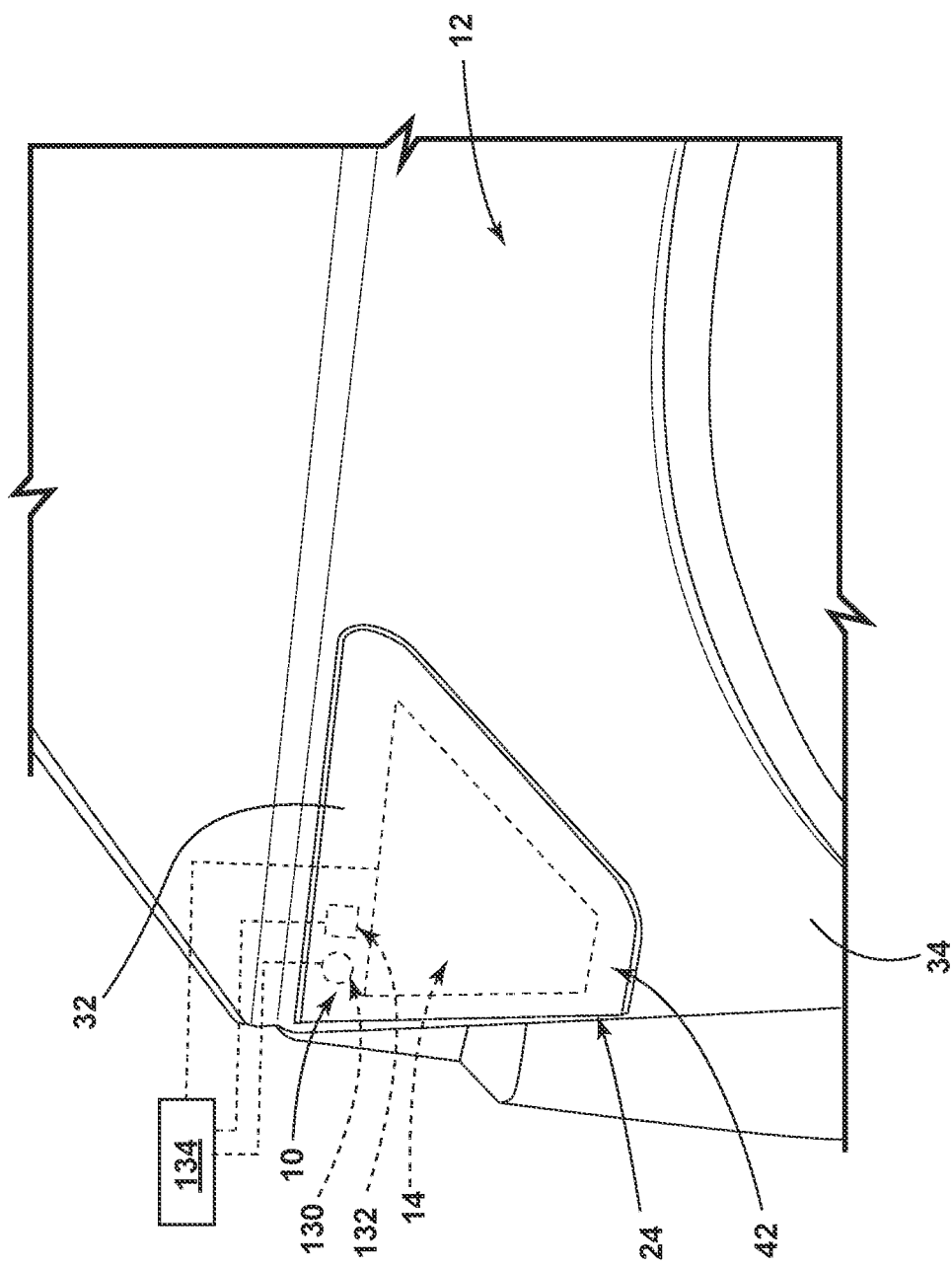
Figure 2C:
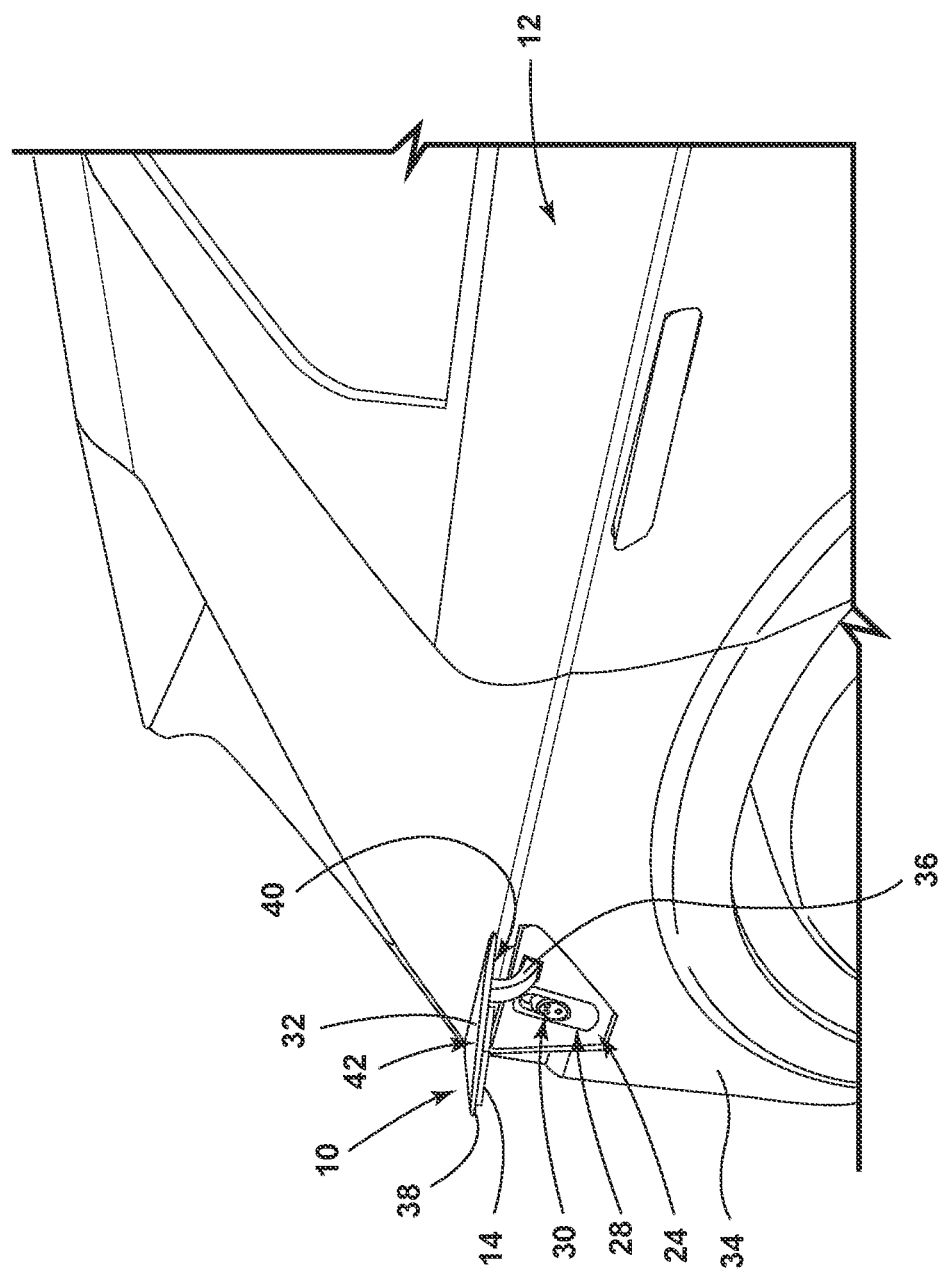
Figure 2D:
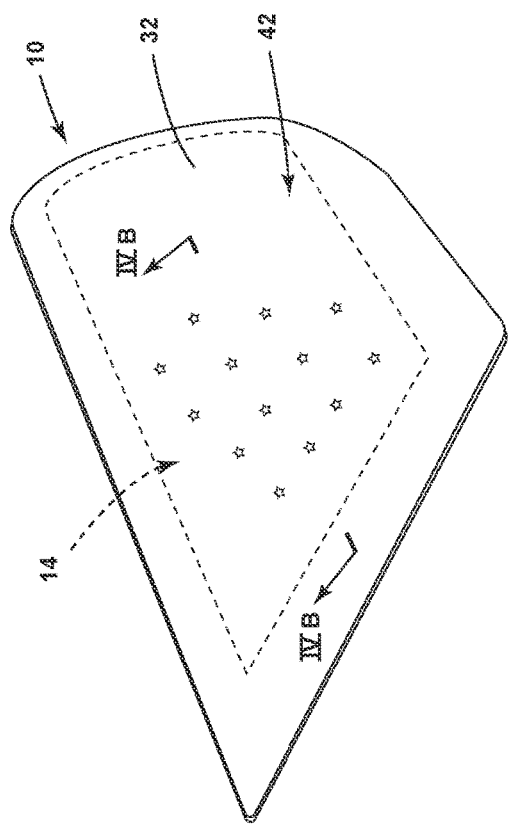
Figure 2F:
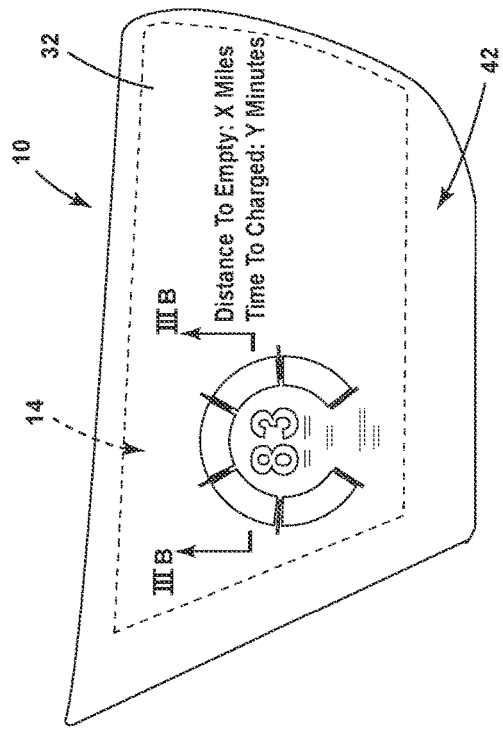
Figure 2E:
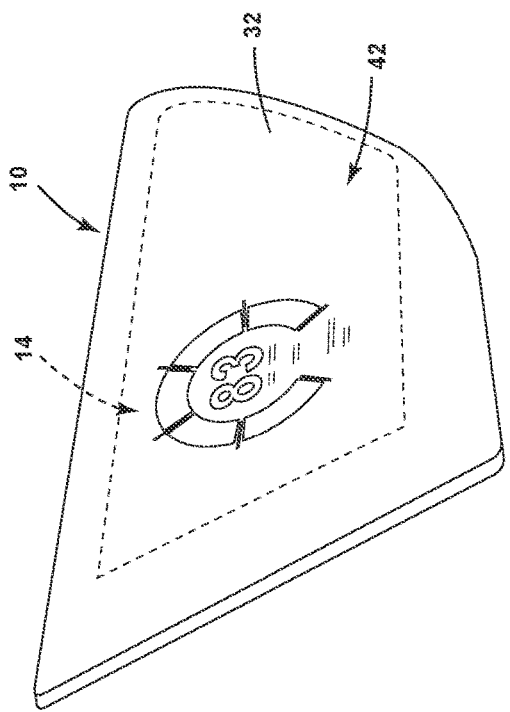

As illustrated in FIGS. 2D-2F, the LED display 14 may be capable of matching a curvature in one or more axes of the charge port door 32. In operation, the LED display 14 can produce graphics in the form of pictograms, lettering, and/or numerals. For example, as shown in FIG. 2D, the LED display 14 may emit light in a defined pattern to create illuminated graphics in the form of various designs that are visible from the exterior of the vehicle 12 (e.g., the A-side 42 of the charge port door 32) when the charge port door 32 is in the open position and the closed position. Additionally or alternatively, as shown in FIGS. 2E and 2F, the LED display 14 may emit light in a defined pattern to create illuminated graphics in the form of information that may be provided to a user of the vehicle 12. For instance, the information may be a charged percent of the vehicle battery 26, a time to fully charge the vehicle battery 26, a charging speed of the battery 26, an estimated number of miles until empty with the battery 26 at the current charge level, an estimated cost to fully charge the battery 26 based on various charging parameters, a supplier of the charger that is providing energy to the vehicle 12, account information for a charging account associated with the energy provider, and/or any other information. As shown, the information may be provided in numerical characters, graphs, icons, and/or through any other manner. While the LED display 14 is shown operably coupled with the charge port door 32, it will be appreciated that the LED display 14 may be operably coupled with any other component of the vehicle 12 and operate similarly to that described herein without departing from the scope of the present disclosure.

Figure 2G:
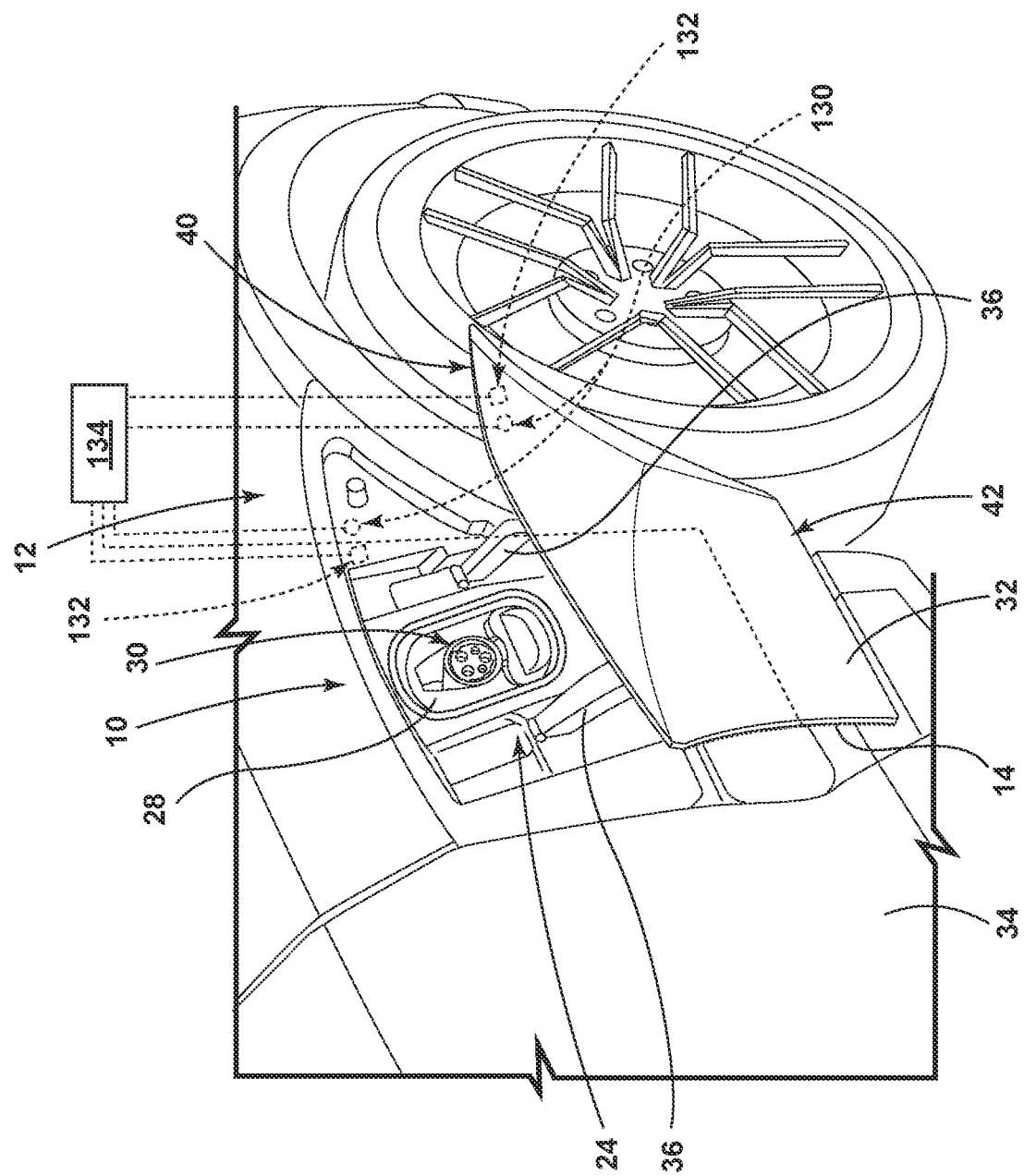

With further reference to FIGS. 2A-2J, in various examples, the charge port door 32, which may be located on a rear portion of the vehicle, as illustrated in FIGS. 2A-2C, a front portion of the vehicle, as illustrated in FIGS. 2A and 2G, and/or any other portion of the vehicle. Moreover, as provided herein, the charge port door 32 may be configured to selectively open to expose the charging port 30 and close to cover the charging port 30. In FIG. 2A, the charge port door 32 is illustrated in the closed position and, in FIG. 2G, the charge port door 32 is illustrated in the open position. The charge port door 32 can be mounted to the body 34 of the vehicle 12 and/or the support structure 28 by a hinge 36 to rotate between the open and closed positions. While the charge port door 32 is rotatable between the closed position and the open position in the illustrated example, it will be appreciated that the charge port door 32 may move between the closed position and the open position in any manner without departing from the scope of the present disclosure.

As shown in FIGS. 2G-2J, the LED display 14 may be operably coupled with the charge port door 32. In some cases, the LED display 14 may be positioned at least partially within an LED housing 38 that may be operably coupled with a B-side 40 of the charge port door 32. In such instances, the light emitted from the LED display 14 may be transmitted through at least a portion of the charge port door 32 to be visible from the exterior of the vehicle 12 (e.g., the A-side 42 of the charge port door 32) when the charge port door 32 is in the open position and the closed position. Additionally or alternatively, the light emitted from the LED display 14 may be visible through the LED housing 38 when the charge port door 32 is in the open position. It will be appreciated, however, that the LED display 14 may be operably coupled with any other portion of the charging system without departing from the teachings provided herein.

Figure 2H:
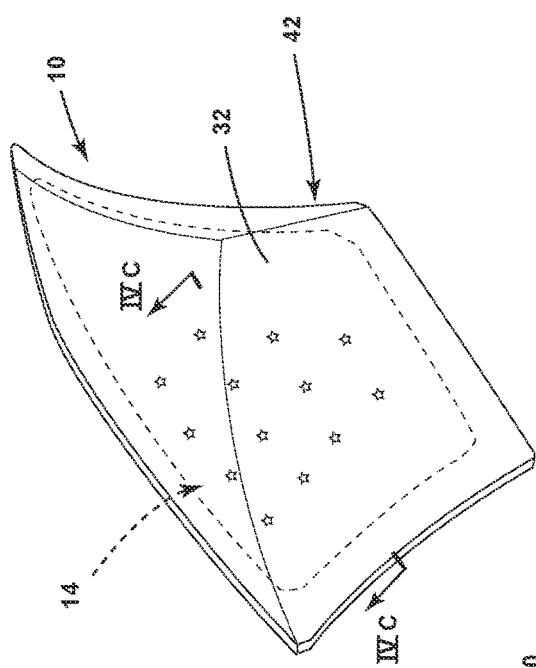
Figure 2J:
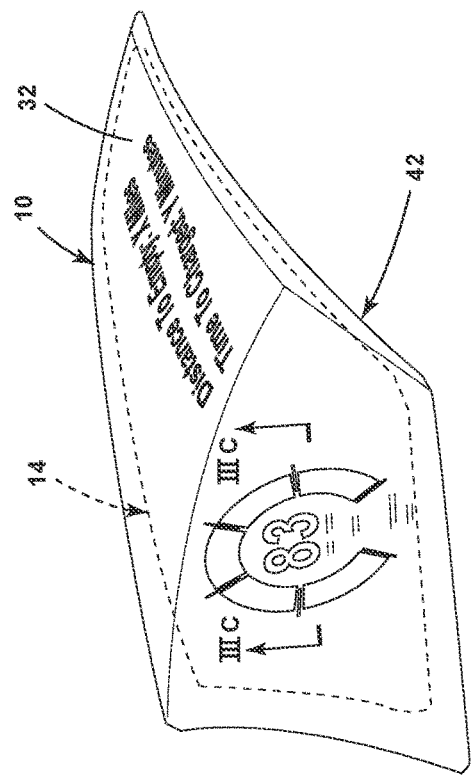
Figure 2I:
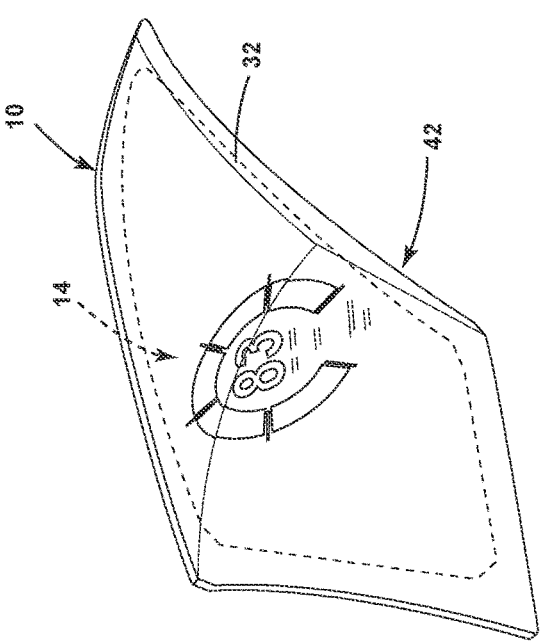

As illustrated in FIGS. 2G-2J, the LED display 14 may be capable of matching a contour in one or more axes of the charge port door 32. In operation, the LED display 14 can produce graphics in the form of pictograms, lettering, and/or numerals. For example, as shown in FIG. 2H, the LED display 14 may emit light in a defined pattern to create illuminated graphics in the form of various designs that are visible from the exterior of the vehicle 12 (e.g., the A-side 42 of the charge port door 32) when the charge port door 32 is in the open position and the closed position. Additionally or alternatively, as shown in FIGS. 2I and 2J, the LED display 14 may emit light in a defined pattern to create illuminated graphics in the form of information that may be provided to a user of the vehicle 12. For instance, the information may be a charged percent of the vehicle battery 26, a time to fully charge the vehicle battery 26, a charging speed of the battery 26, an estimated number of miles until empty with the battery 26 at the current charge level, an estimated cost to fully charge the battery 26 based on various charging parameters, a supplier of the charger that is providing energy to the vehicle 12, account information for a charging account associated with the energy provider, and/or any other information. As shown, the information may be provided in numerical characters, graphs, icons, and/or through any other manner. While the LED display 14 is shown operably coupled with the charge port door 32, it will be appreciated that the LED display 14 may be operably coupled with any other component of the vehicle 12 and operate similarly to that described herein without departing from the scope of the present disclosure.

Referring further to FIGS. 2A-2J, the light system 10 may include a switch assembly 130 which may be positioned on the door 32, within the charger assembly 24, and/or in any other location. The switch assembly 130 may activate/deactivate the LED display 14, toggle the LED display 14 between the various illumination settings (i.e., selectively illuminate the various illumination zones), move the door 32 between open and closed positions, and/or activate/deactivate any other feature of the vehicle 12. The switch assembly 130 may be configured as a proximity switch, such as, but not limited to, capacitive sensors, inductive sensors, optical sensors, temperature sensors, resistive sensors, the like, or a combination thereof. Moreover, the switch assembly 130 may additionally and/or alternatively include a mechanical switch of any known type known, such as a push button. In push button examples, a membrane may be provided as a seal over the switch. Depression of the membrane causes depression of a plunger on the switch. Internal switch contacts then change positions to provide an output signal.

With further reference to FIGS. 2A-2J, the light system 10 can include a light sensor 132 that may be utilized for varying the intensity of emitted light emanated from the LED display 14. The light sensor 132 can detect ambient lighting conditions, such as whether the vehicle 12 is in day-like conditions (i.e., higher light level conditions) and/or whether the vehicle 12 is in night-like conditions (i.e., lower light level conditions). The light sensor 132 can be of any suitable type and can detect the day-like and night-like conditions in any suitable fashion. According to some examples, the colors of light and/or intensities of the emitted light from the LED display 14 may be varied based on the detected conditions. The light sensor 132 may be integrated into the vehicle 12 or into the LED display 14.

Referring still to FIGS. 2A-2J, each LED display 14, switch assembly 130, and/or light sensor 132 can be electrically coupled with a controller 134. The controller 134 can provide each LED assembly 14 with generated pulse width modulated (PWM) signals to produce the corresponding light intensity and/or light color, which may be based on inputs received from the switch assembly 130 and/or the light sensor 132. Alternatively, the controller 134 can directly drive the current to each LED display 14 to accomplish the same variations in intensity and/or light color. In some examples, the LED display 14 may illuminate in a variable intensity. In such instances, the LED display 14 may illuminate at a first intensity, such as 33% PWM. If the ambient temperature is below a predetermined temperature (e.g., 100 degrees Fahrenheit), the LED display 14 may progressively increase in intensity until the LED display 14 reach a maximum desired intensity, such as 100% PWM, or until the predetermined temperature is exceeded.

Figure 3B:
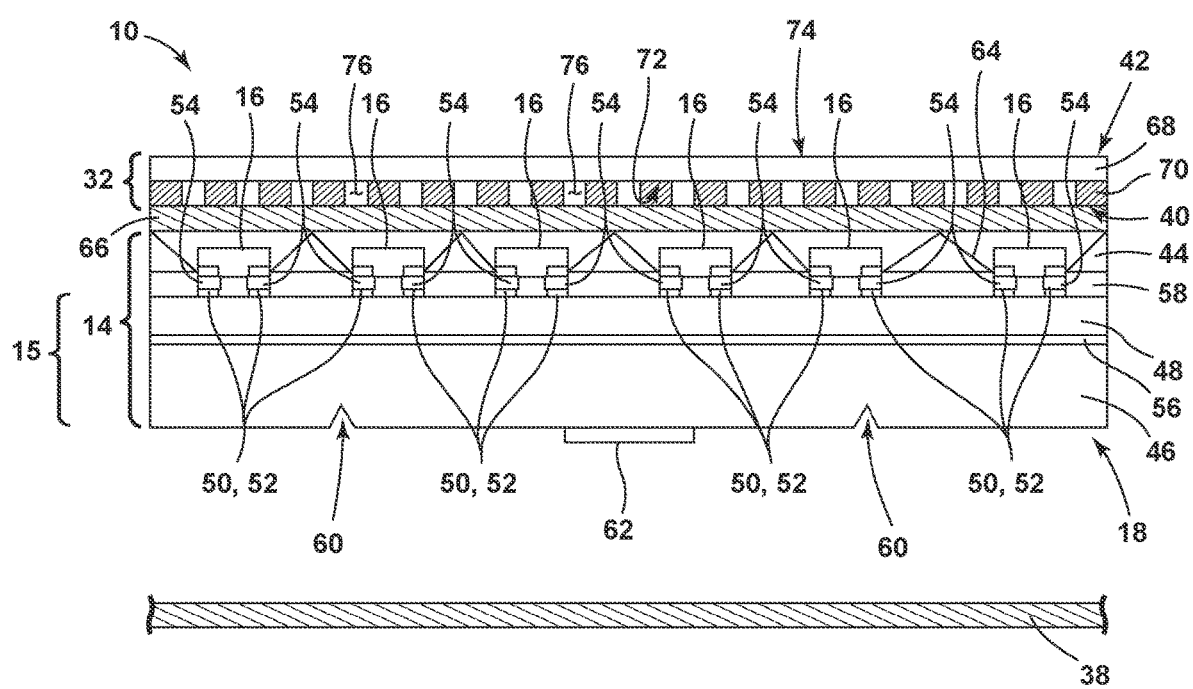
FIG. 3B is a cross-sectional view of the light system taken along the line IIIB-IIIB of FIG. 2F.
Figure 3C:
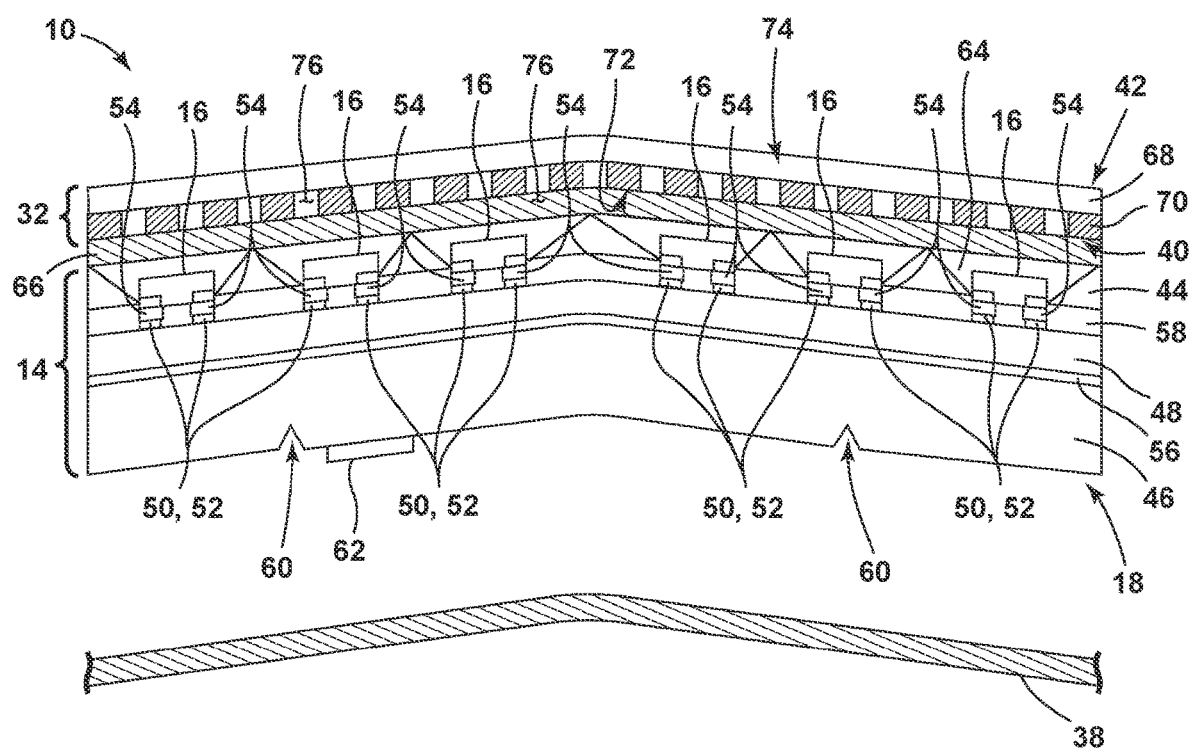
FIG. 3C is a cross-sectional view of the light system taken along the line IIIC-IIIC of FIG. 2F.

Referring now to FIGS. 3A-3C, a cross section of the flexible LED display 14 and the charge port door 32 taken along the line IIIB-IIIB of FIG. 2F is illustrated in accordance with various aspects of the present disclosure. As provided herein, the LED display 14 may be capable of curvature in one or more axes and produce graphics in the form of pictograms, lettering, and/or numerals.

As illustrated, the LED display 14 can include a protection layer 44 (e.g., a conformal coating) to protect the LED chips 16 from, for example, contamination, hydrogen sulfide, and moisture as well as to enhance light extraction from the LED chip 16. In various examples, the protection layer 44 may be formed from a material that is flexible or capable of elastic deformation, such as a polymerizable compound, a mold in clear (MIC) material, a mold in white (MIW) material, and/or any other material. In some examples, the flexible material can include urethanes, silicone, thermoplastic polyurethane (TPU), and/or other optical-grade flexible materials with volatile organic compounds (VOC's).

In various examples, the LED display 14 can further include a circuit board that is configured to electrify or energize the LED chips 16. The circuit board 15 may include a substrate 46 manufactured from a thermally conductive dielectric that has a high flexural strength fracture resistance, which may be greater than 200 MPa and a bending modulus that may be greater than 25 GPa. In some examples, the circuit board may be a thin ceramic-filled and/or glass-filled composite. For example, the circuit board can include embedded ceramic particles, fibers, or ribbons, such as boron nitride, alumina, aluminum nitride, silicon nitride, yttria, or zirconia, which may improve the thermal conductivity of the circuit board. The improved thermal conductivity can allow the LED chips 16 to operate at lower temperatures thereby improving the performance and efficiency of the flexible LED display 14.

In various examples, the LED chips 16 may be soldered directly or indirectly to one or more traces 48, which may be formed of copper, aluminum, tin, silver, or any other material. In various examples, the traces 48 may further be plated with electroless nickel 50 and immersion gold 52 (ENIG) to enhance the adhesion of a solder 54 to the traces 48 and to mitigate against tarnishing in harsh environments. In some instances, the LED display 14 may further include a solder mask 58 to isolate and protect the circuit.

In some examples, the circuit board may be flexible (e.g., capable of conforming to a non-linear profile without degradation in performance). In such cases, the LED display 14 may include a polyimide dielectric 56, which can isolate electrically the circuit from the flexible PCB substrate 46. In various examples, the flexible PCB substrate 46 may be formed from an aluminum-silicon material and/or have a thickness of 0.2 mm to 0.6 mm. Moreover, the flexible PCB substrate 46, in addition to being flexible, can also dissipate heat produced by the LED chips 16. The silicone materials maintain transparency over the high temperature in the visible wavelengths. In addition, circuit interconnects can be designed to dissipate heat in tandem with the PCB substrate 46 upon which is adhered the polyimide 3008. The polyimide material can further enable the flexing of the dielectric 56 without cracking, thereby enabling the maintenance of dielectric strength.

In various examples, the LED display 14 can have a radius of curvature down to a 2 mm radius. In addition, with scoring 60 (e.g., v-scoring), the sheets of the circuit board can be conformed in two axes (e.g., x-direction and y-direction) to produce free-form contours.

In some instances, the individual traces 48 electrify the LED chips 16 individually at a tight pitch (e.g., as close as approximately 0.2 mm) to enable a higher resolution display capable of illustrating graphics, such as pictograms, text, numerals, and/or any other information with enhanced visibility. Moreover, the LED chips 16 may each be configured as an LED chip on board (COB). In some examples, the LED COB can be designed to occupy 100-350 µm (e.g., mini chips) and 2-100 µm (e.g., microchips). In addition, configurations of micro LED chips 16 with a size of less than 50 µm may have a sapphire or Si substrate removed, such as by UV excimer or via grinding etch, or polishing may be utilized. In some instances, by using an LED chip on board versus a standard 3030 or 3.0×3.0 mm package, the space savings of each LED chip on the PCB 18 can be over 99% when compared to a standard 3030 or 3.0×3.0 mm package. In some examples, the LED chip 16 may be an LED flip chip with both a first electrode and a second electrode positioned on a common side of the LED chip 16 on a surface facing away from the light extraction surface. As such, the LED chips 16 may be bonded to the traces 48.

Additionally or alternatively, in various examples, the LED chip 16 may include an array of LEDs that are configured to emit varied colors of light for an RGBW (red, green, blue, and white) LED chip, an RGB LED chip, a white LED chip and/or any other assortment of LEDs. In addition, in some cases, each LED chip 16 can include an internal LED driver for controlling light output from the respective LED chip 16. Alternatively, in some cases, a controller 62 may be configured as a driver of one or more of the LED chips 16 with the controller 62 being remote from the LED chip 16. The direct emission capability of the LED display 14 can enable high efficiency or greater than or equal to 90%. In addition, the LED display 14 can achieve 16-bit greyscale dimming for smooth transitions and fluid graphics. Moreover, the LED display 14 can have a high contrast, which may be greater than or equal to 1,000:1. In some cases, as each luminous pixel can be turned completely off, the contrast ratio (CR) can be greater than 100,000:1. However, there may be some lateral pixel bloom due to emission pattern from the LED chips 16. In some instances, the greatest enhancement to visual appearance can be in the appearance of contrast ratio in the presence of high ambient sunlight. In various instances, the brightness of the LED display 14 can approach a brightness of greater than or equal to 8,000 nits $cd/m^2$ in red 625 nm, or 50,000 nits $cd/m^2$ in white D55, which can enable the LED display 14 to be utilized in exterior lighting, signaling, and messaging environments.

With further reference to FIGS. 3A-3C, the controller 62 may be configured as any suitable processor-based device, such as a computing device or any suitable combination of computing devices. Thus, in several embodiments, the controller 62 may include one or more processor(s) and associated memory device(s) configured to perform a variety of computer-implemented functions for interfacing with and operating the various components of the vehicle 12. The controller 62 can be configured to receive information from the vehicle 12 and can be configured to interpret that information and issue commands to the LED display 14. In some embodiments, the controller 62 may be implemented within the LED display 14 to allow for the disclosed LED display 14 to function without requiring additional software to be uploaded onto existing control devices of the vehicle 12 (FIG. 2A). In examples in which the controller 62 is operably coupled with the PCB substrate 46, the controller 62 may be mounted in a manner that allows for the circuit board to be capable of conforming to a non-linear profile without degradation in performance of the controller 62. Additionally or alternatively, the controller 62 may be part of an overall vehicle control module, such as a body control module (BCM) or vehicle system controller (VSC).

In some examples, such as the one illustrated in FIGS. 3A-3C, an optic 64 may be optically coupled with the LED sources. In some cases, the optics 64 may be formed independently and/or in combination. Moreover, the optics 64 may be flexible or capable of elastic deformation and formed from a polymerizable compound, a mold in clear (MIC) material, a mold in white (MIW) material, and/or any other material. Such flexible materials can include urethanes, silicone, thermoplastic polyurethane (TPU), or other optical grade flexible materials or combinations of high durometer glass lens materials ShoreD 60 with soft silicone webbing Shore A 40.

An intermediate layer 66 may be disposed between the protection layer 44 and the charge port door 32. In various examples, the intermediate layer 66 may be configured as a light-altering layer, which may be in the form of a diffuser, a light filter, a tint, and/or any other material. In examples in which the intermediate layer 66 includes a diffuser, the diffuser may be configured as a one or two-side diffuser that is designed to break up and distribute light evenly so that hot spots and shadows may be eliminated. Moreover, the diffuser may have any desired light transparency and haze. For example, the diffuser may have a light transparency between 30% and 95% and a haze that may be above 70%. In examples in which the intermediate layer 66 includes a light filter, the light filter may be configured to absorb light that is transmitted from an exterior of the vehicle 12 towards the LED display 14. In examples in which the intermediate layer 66 includes a tint, the tint may be configured as a tinted film having light transmissive properties. In various examples, the tinted film may be of any desired color. For instance, the tinted film may be of a generally similar color to that of the vehicle body 34 and/or a darker color to assist in concealing the LED display 14 positioned along the B-side 40 of the charge port door 32.

As shown in FIGS. 3B and 3C, the charge port door 32 may be positioned on an opposing side of the intermediate layer 66 from the protection layer 44. In various examples, the charge port door 32 can include a panel 68 and a decorative layer 70. The panel 68 may be formed from a generally rigid material, such as a polymerizable compound, a mold in clear (MIC) material, and/or mixtures thereof. Additionally or alternatively, acrylates can also be used, as well as poly methyl methacrylate (PMMA), which is a known substitute for glass. Additionally or alternatively, a polycarbonate material may also be used in an injection molding process to form the panel 68. Additionally or alternatively, a material containing polyvinyl butyral (or PVB) may be used due to its binding capabilities, optical clarity, adhesion to many surfaces, toughness, and flexibility.

The decorative layer 70 may be in the form of paint, a film, or any other structure that is configured to provide various aesthetic effects to the charge port door 32. When configured as a coating, the decorative layer 70 may be applied to the panel 68 through a painting, screen printing, spraying, slot coating, dip coating, roller coating, and/or bar coating process. As illustrated, the decorative layer 70 may be applied to a B-side 72 of the panel 68 and/or an A-side 74 of the panel 68. In instances in which the decorative layer 70 is applied to the B-side 72 of the panel 68, the aesthetic provided by the decorative layer 70 may be viewed through the panel 68.

In some examples, the decorative layer 70 can define one or more channels 76 therethrough. In operation, light emitted from the LED display 14 may be transmitted through the one or more channels 76 and the panel 68 such that the light can be emitted through the B-side 72 of the panel 68 and outwards through the A-side 74 of the panel 68. As such, the LED display 14 may be generally concealed or not easily visible from the A-side 74 of the panel 68 when the LED display 14 is unilluminated and one or more graphics may be visible through the panel 68 when the LED display 14 is illuminated.

In some examples, the one or more channels 76 may be formed through a laser-based coating removal process that uses pulses of light from high-power lasers to ablate or vaporize the decorative layer 70 from the panel 68. Each pulse forms one or more of the channels 76 that may have a surface area of 0.1 to 100 square mm, or any other desired size. In operation, the laser is pointed to a different area after each pulse, where the removal process is repeated until a defined channel pattern is formed through the decorative layer 70. In various examples, the channel pattern may vary from one portion of the decorative layer 70 to a second portion with the variation being in the size and/or concentration of channels 76.

Figure 4B:
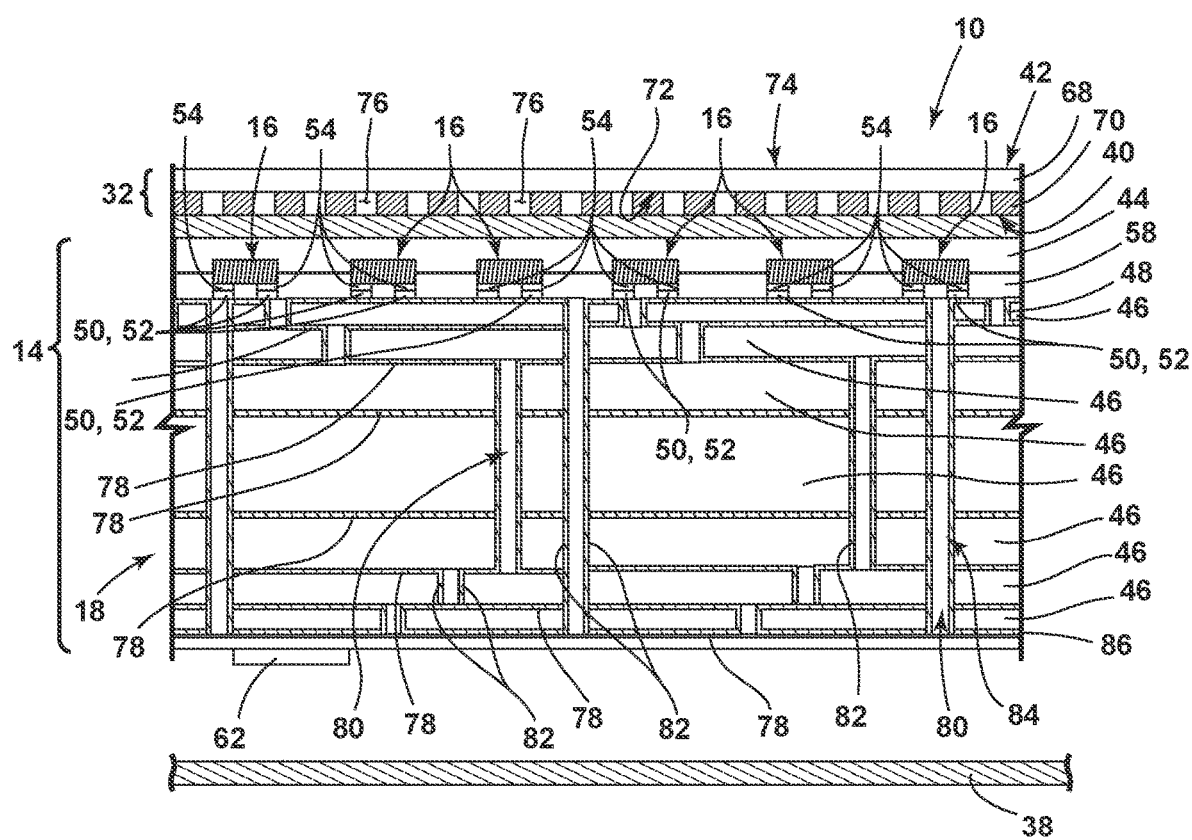
FIG. 4B is a cross-sectional view of the light system taken along the line IVB-IVB of FIG. 2D.
Figure 4C:
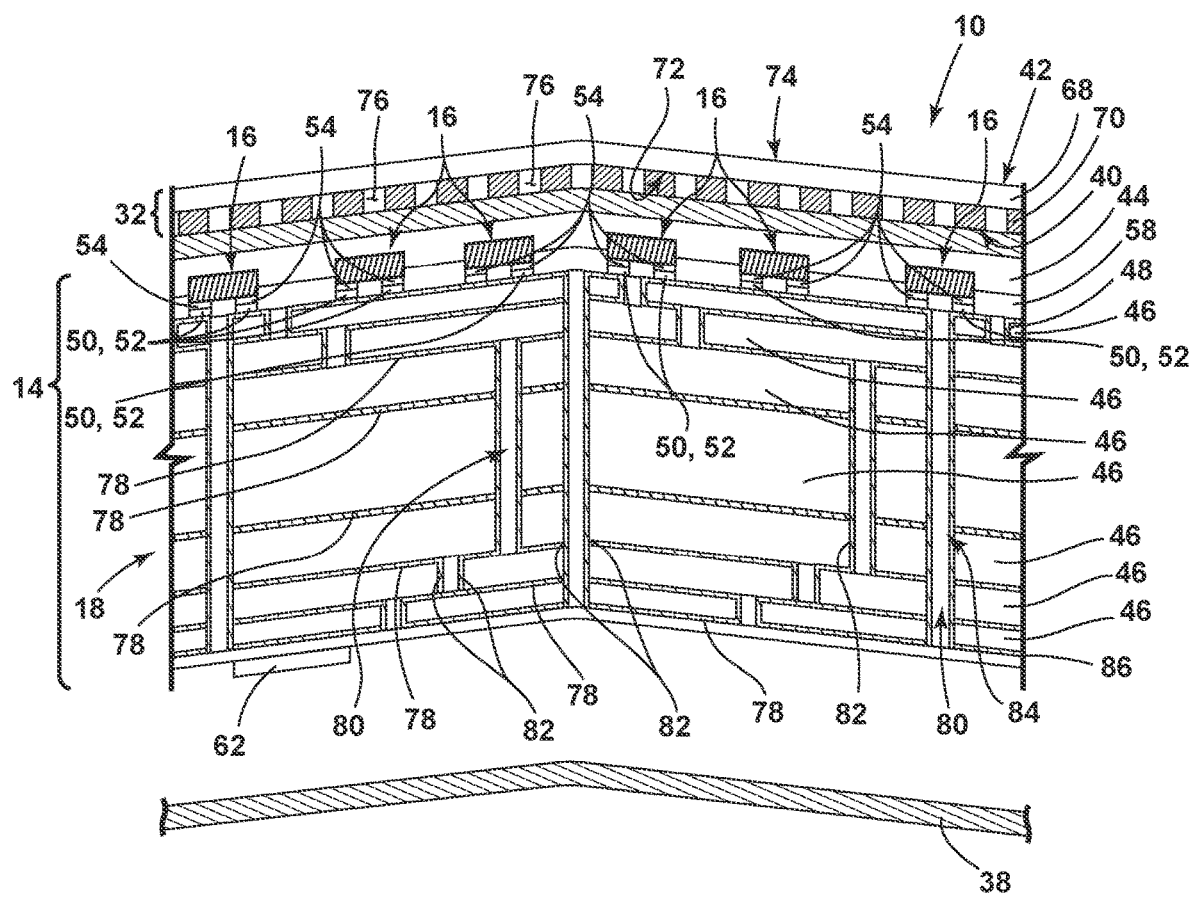
FIG. 4C is a cross-sectional view of the light system taken along the line IVC-IVC of FIG. 2D.

Referring now to FIGS. 4A-4C, the LED display 14 can include a layer of silicone 44 to protect components of the LED display 14, a solder mask 58 to isolate and protect the circuit, LED chips 16, adhered directly or indirectly to the PCB 18 through solder 54, which adheres to the immersion gold plating 52 applied to electroless nickel upon the top surface of the traces 48 (e.g., Cu interconnects). In some instances, the traces 48 can be of a thickness of ⅓ oz Cu to 1 oz Cu depending on the pad gap for electrifying the LED chips 16 and the thermal dissipation desired.

In the examples illustrated in FIG. 4A-4C, a PCB substrate 46 may be made of a resilient material that enables flexibility and dielectric isolation, such as a ceramic-filled fr4 or CEM3 material in which the fillers are arranged as ceramic fibers or ribbons. In various examples, the resilient material can be produced, for example, by embedding ceramic particles, such as boron nitride, alumina, silicon nitride, yttria, or zirconia into a dielectric medium of the CEM3 material. In such cases, the thermal conductivity can be improved from about 0.3 degrees Celsius/Watt for standard materials to up to about 1.5 degrees C./Watt. This can allow the LED chips 16 to operate at lower temperatures thereby improving performance and efficiency. In various examples, the thickness of the dielectric 56 can be as thin as 40 μm up to 1.6 mm, and in some instances, between 0.1 to 0.2 mm for flexibility that allows for LED display 14 curvature flexing as the flexing is at least partially dependent on thickness. For example, a ceramic fiber-filled composite having a 0.2 mm thickness can bend to a 30 mm radius of curvature, and a ceramic fiber-filled composite having a 0.4 mm thickness can bend to a 165 mm radius of curvature before fracturing. In some instances, a radius of bend curvature between 20 and 40 mm will satisfy many freeform surfaces to which the LED display 14 may be attached. In some examples, by stacking thin Copper/dielectric materials, multi-layer flexible displays can be constructed with driver components on the back side or B-side of the PCB with mini or micro-LED on the top layer or A-side.

The flexibility of the materials and a low CTE or coefficient of thermal expansion may be useful for maintaining the reliability of the solder joints of the PCB 18 over temperature cycling extremes. For example, when compared to 500 cycles for a pure aluminum 1090 with a CTE of 23.6 ppm/degrees Celsius, an aluminum/silicon alloy with a CTE of 19 ppm/degrees Celsius can survive an increased number of thermal shock cycles from −40 degrees Celsius to +125 degrees Celsius for 2,000 cycles without failures or cracks in solder joints, which can impact the brightness of the LED display pixels.

In some examples, the PCB 18 can include one or more conductive layers 78 of a heat dissipation material, such as copper (Cu). Additionally or alternatively, the PCB 18 may include one or more layers of substrates 46. In various examples, one or more thermal vias 80, which may be constructed of copper (Cu), may be defined by the conductive layers 78 and/or the layers of substrates 46 to dissipate heat from the traces 48 therethrough. For instance, as illustrated in FIGS. 4B and 4C, the substrate 46 may include eight conductive layers 78 (or any other number of conductive layers 78) that are separated by seven respective layers of substrates 46. In some cases, each of the layers of substrates 46 may be of a common thickness. Alternatively, at least one layer of the dielectric 56 may have a thickness that is varied from at least one other layer of the dielectric 56.

As shown in FIGS. 4B and 4C, the thermal vias 80 may be formed by one or more holes defined by the various conductive layers 78 and/or layers of substrates 46 to dissipate heat from the LED display 14. As illustrated, the thermal vias 80 may include an interconnect 82 that may be formed from any practicable material, such as copper (Cu). Moreover, a filler material 84 may be positioned adjacent to the interconnect 82, the conductive layers 78, and/or the layers of substrates 46. For example, the filler material 84 may be an epoxy material, and/or any other practicable material. As provided herein, the thermal vias 80 allow additional heat transfer by providing a reduction in thermal resistance. The number and position of thermal vias 80 have an impact on thermal resistance.

In some cases, a solder mask 86 can protect the heat dissipation material (e.g., copper (Cu)) on a rear side of the circuit that is opposite the silicon layer 44.

As provided herein, the LED display 14 may be operably coupled with the charge port door 32 with an intermediate layer 66 positioned therebetween. As described above, the charge port door 32 may include a panel 68 and a decorative layer 70. One or more channels 76 may be defined through the decorative layer 70 (and possibly, the panel 68) to allow light emitted from the LED display 14 to pass therethrough.

Figure 5A:
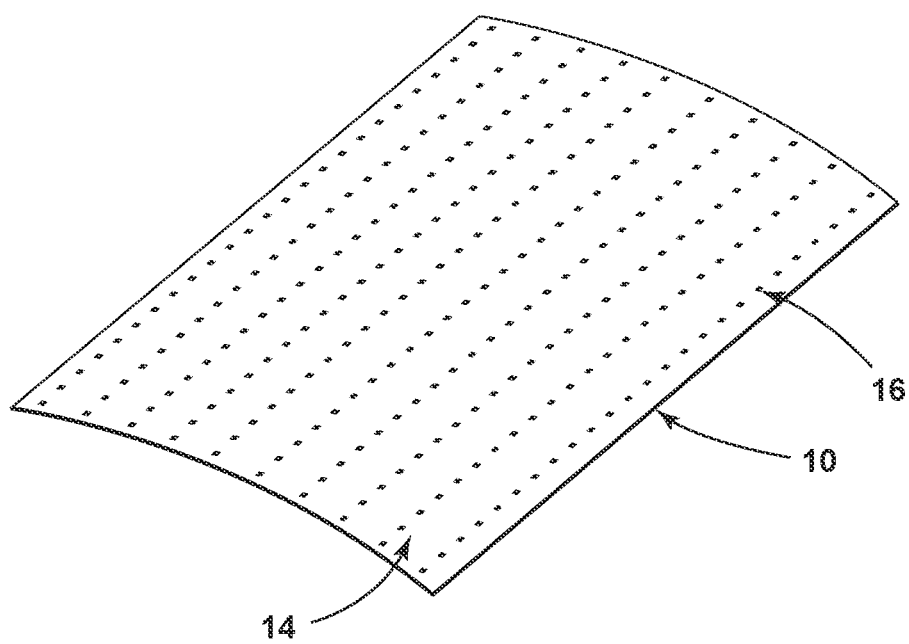
FIGS. 5A-5F depict flexible LED displays in accordance with various aspects of the present disclosure.
Figure 5B:
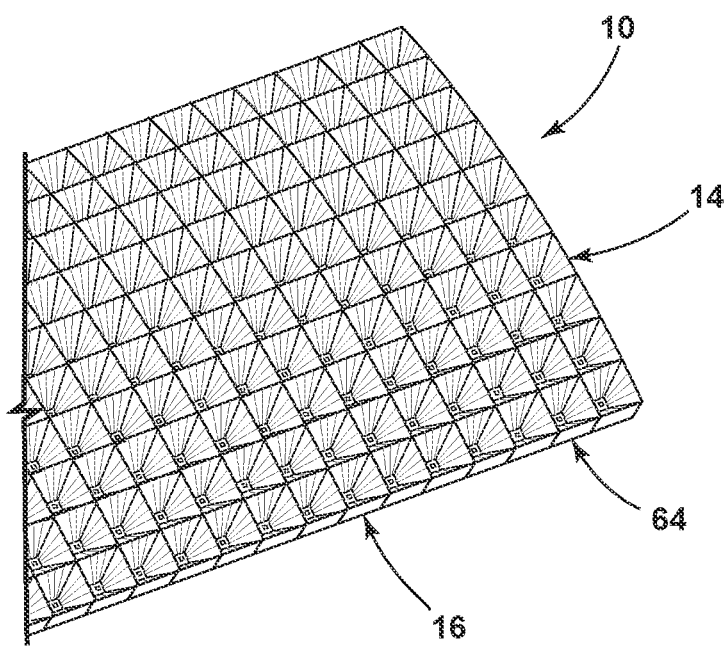
Figure 5C:
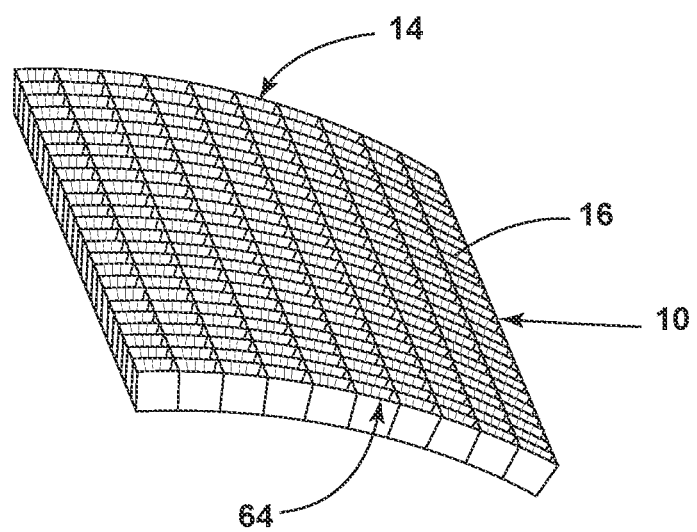

Referring now to FIGS. 5A-5C, the LED display 14 can be flexed in one axis in accordance with aspects of the present disclosure. In some examples, the LED chip 16 can produce collimation in a Lambertian pattern with approximately 0.2-0.3 cd/lm. In some cases, optics 64 that are specially tailored to the LED chip's small emission area may be utilized to boost collimation from the LED chip 16, which may boost the collimation to 2-10 cd/lm thereby enabling more useful light to be directed in a defined direction.

As shown in FIGS. 5A-5C, in some examples, the LED display 14 can have a curvature in one direction, which may be more than, equal to, or greater than 71 mm on a radius. In some instances, the curvature can permit directional light to be guided in a defined direction. The optics 64, as shown, can produce a 25 degrees beam, which can be less than the natural 125 degrees beam of the bare LED chip 16. In some examples, the optics 64 can have a low profile (e.g., less than or equal to 4 mm). In addition, the optics 64 may form light patterns with a tight density, which can enable the combination of both lit uniformity and collimation. Also, hot spots can be reduced to not be noticeable to drivers.

Figure 5D:
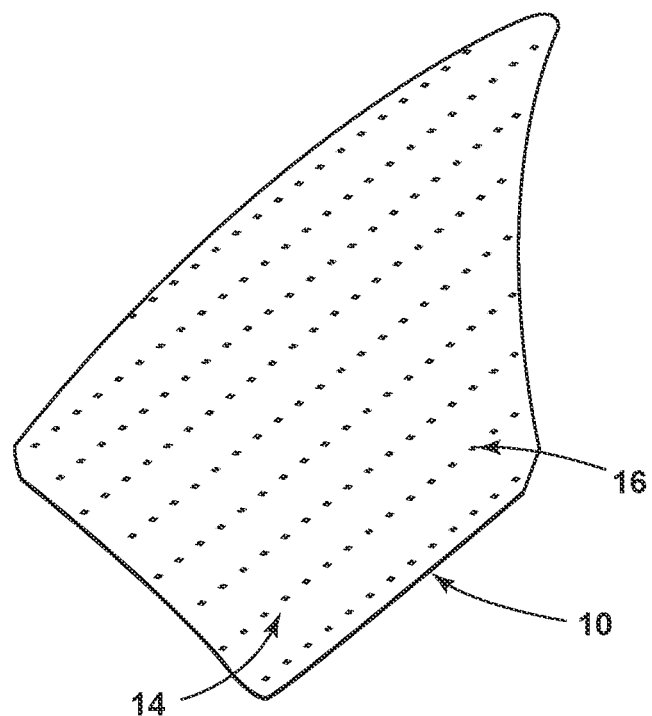
Figure 5E:
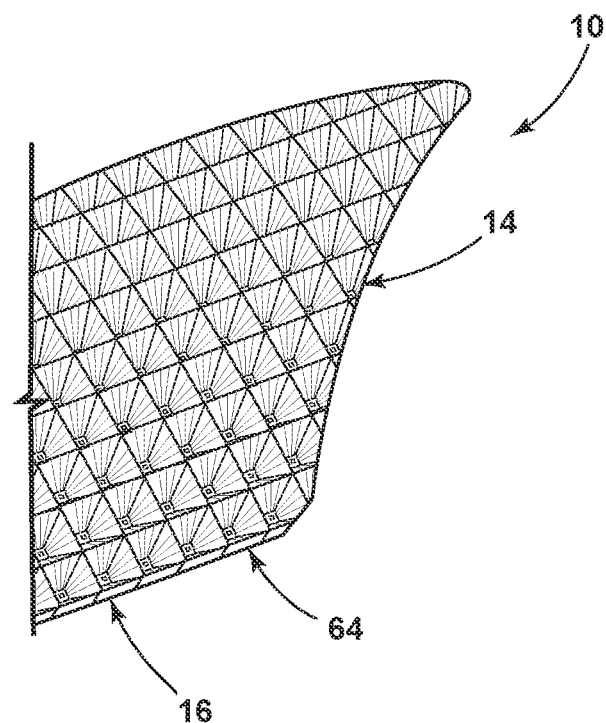
Figure 5F:
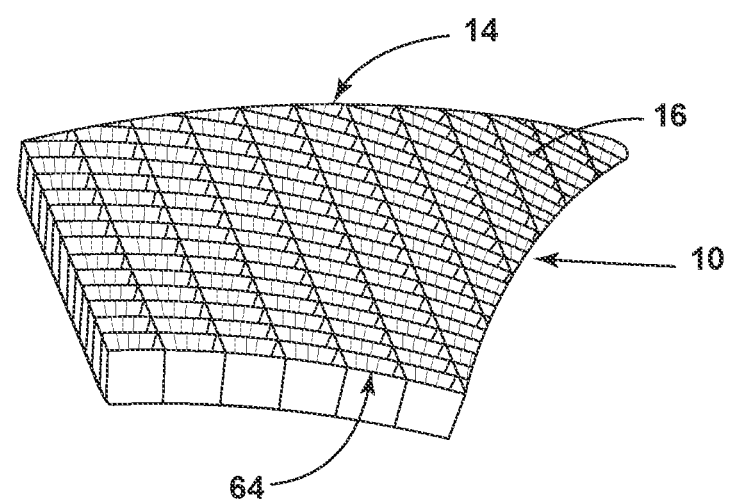

As shown in FIGS. 5D-5F, in some examples, the LED display 14 can have a curvature in multiple directions, which may be more than, equal to, or greater than 10 mm on a radius in each direction of curvature. In some instances, the curvature can permit directional light to be guided in a defined direction. The optics 64, as shown, can produce a 25 degrees beam, which can be less than the natural 125 degrees beam of the bare LED chip 16. In some examples, the optics 64 can have a low profile (e.g., less than or equal to 4 mm). In addition, the optics 64 may form light patterns with a tight density, which can enable the combination of both lit uniformity and collimation. As such, in various instances, the light system 10 may be flexible and capable of being positioned in a non-planar profile to produce free-form contours.

Figure 6A:
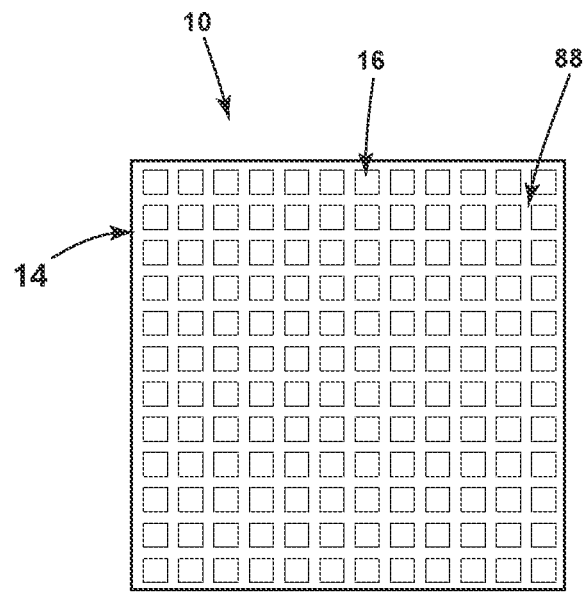
FIG. 6A is a front view of the flexible LED display in an unilluminated state in accordance with various aspects of the present disclosure.
Figure 6B:
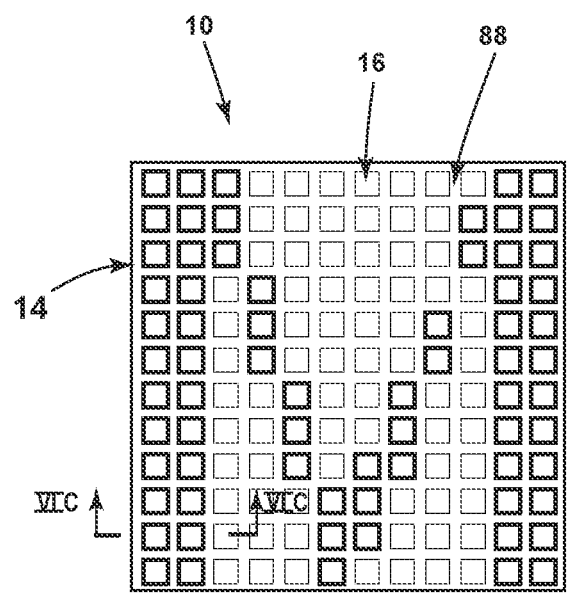
FIG. 6B is a front view of the flexible LED display in a partially illuminated state to form a graphic in accordance with various aspects of the present disclosure.
Figure 6C:
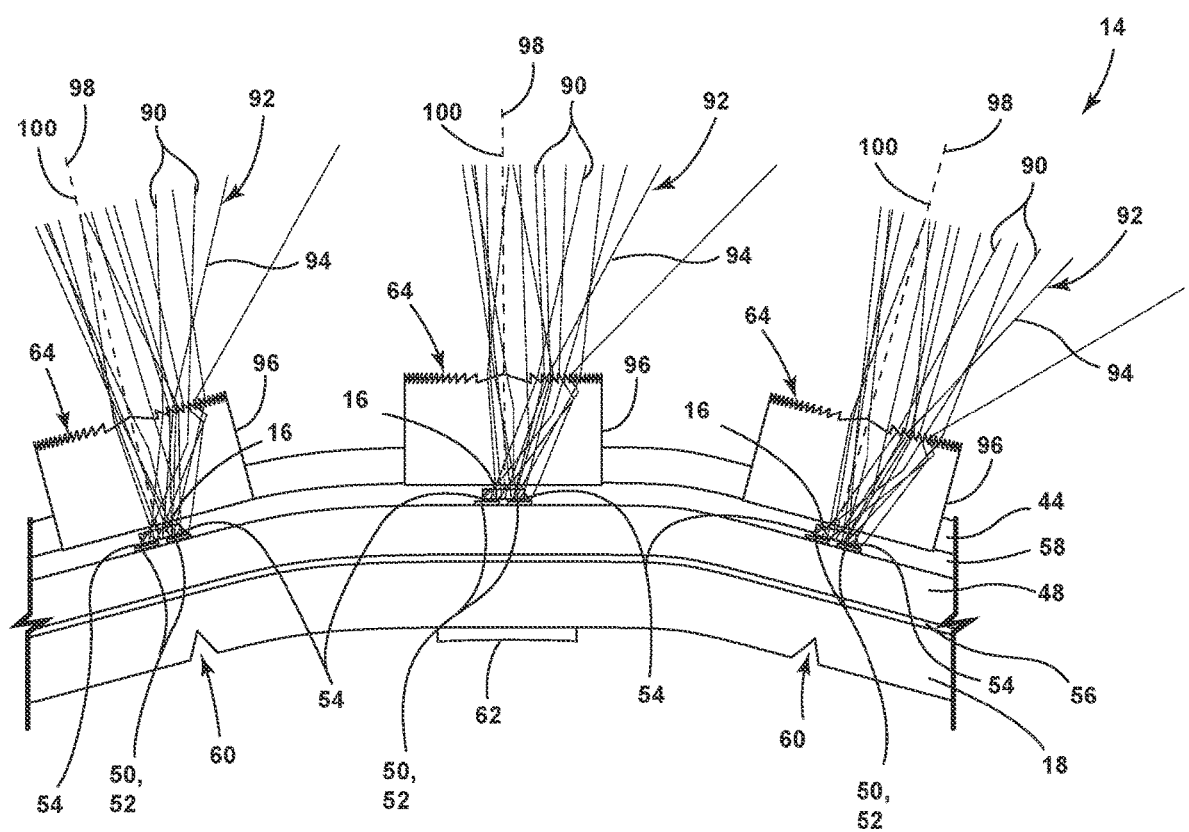
FIG. 6C is a cross-sectional view taken along the line VIIC-VIIC of FIG. 6B.

Referring now to FIGS. 6A-6C, the LED display 14 is illustrated in accordance with various aspects of the present disclosure. As illustrated, the LED display 14 includes an array 88 of 12×12 LED chips 16 that may be individually electrified via the controller 62 to produce free-form graphics, information display (e.g., lettering and figures), and lighting functions. For example, as shown in FIG. 6B, the LED display 14 may generate various illumination patterns, such as the letter "M" shown.

In some cases, the LED chips 16 can be transferred to an integrated CMOS backplane to provide both control and electronic driver function. In such cases, a system originally producing 100 Hz placement of light pixels can be multiples higher (e.g., 10 to 2,500 times greater) as smaller micro-pixel elements bonded to the silicon (Si) backplane can be placed by high-speed machines. For example, 100 Hz at 100 pixels/tile equals an effective pixel placement rate of 10 kHz at 100 µm LED chip size. At 50 µm LED chip size, 100 Hz with 400 pixels/tile can achieve an effective placement rate of 40 kHz. In various examples, at a LED chip size of 8 µm, 125 pixels/1 mm edge is possible, which can achieve 15,625 pixels/1 $mm^2$. When the micro-tiles are placed at 100 Hz, this achieves an effective pixel placement rate of 1.5 MHz.

Referring further to FIG. 6C, a cross section of the LED display 14 is taken along the line VIC-VIC of FIG. 6B. As previously described, the LED display 14 may include a protection layer 44, a solder mask 58, one or more LED chips 16, and one or more traces 48, which may be plated with electroless nickel and immersion gold 50, 52 (ENIG) to enhance the adhesion of solder 54 to the traces 48 and to mitigate against tarnishing in harsh environments. Moreover, the LED display 14 may include a polyimide dielectric 56, which can isolate electrically the circuit from the flexible PCB substrate 46.

As shown, light ray paths 90 emitted from the LED chips 16 when in an illuminated state. As illustrated, the light ray paths 90 include a central segment ray fan 92 that can pass through an optic 64 within any redirection from the optic 64. The light ray paths 90 also include a lateral segment ray fan 94 that strikes a redirecting surface 96 to alter a ray path 90 of at least a portion of light rays within the lateral segment ray fan 94. In some instances, the redirecting surface 96 may be a total internally reflecting (TIR) surface. As illustrated, the protection layer 44 may be positioned at least partially outwardly of the optic 64 in a Z-direction.

In various examples, each of the optics 64 may be formed independently and/or in combination. Moreover, the optics 64 may be flexible or capable of elastic deformation and formed from a polymerizable compound, a mold in clear (MIC) material, a mold in white (MIW) material, and/or any other material. Such flexible materials can include urethanes, silicone, thermoplastic polyurethane (TPU), or other optical grade flexible materials or combinations of high durometer glass lens materials ShoreD 60 with soft silicone webbing Shore A 40.

In various examples, each LED chip 16 may be configured to emit light about a focal axis 98. Additionally or alternatively, the optic 64 can be optically coupled with the LED chip 16 and can define an optical axis 100. In some instances, the optical axis 100 and the focal axis 98 maintain a generally aligned position when the circuit board is positioned in a non-planar orientation.

As shown by combining tiles of the LED chips 16 with an optic 64 on a flexible curve the lamp can produce light where required in the intensity zones required for FMVSS 108 qualification. FMVSS 108 refers to Federal Motor Vehicle Safety Standard 108 which pertains to all automotive lighting and signaling devices. The mini-chip optics 64 also reduce light bleed and cross talk and enable pictorial representations, graphics, and text as required for an LED display 14 to produce multiple functions.

As provided herein, the LED display 14 may be operably coupled with the charge port door 32 with an intermediate layer 66 positioned therebetween. As described above, the charge port door 32 may include a panel 68 and a decorative layer 70. One or more channels 76 may be defined through the decorative layer 70 (and possibly, the panel 68) to allow light emitted from the LED display 14 to pass therethrough.

Figure 7A:
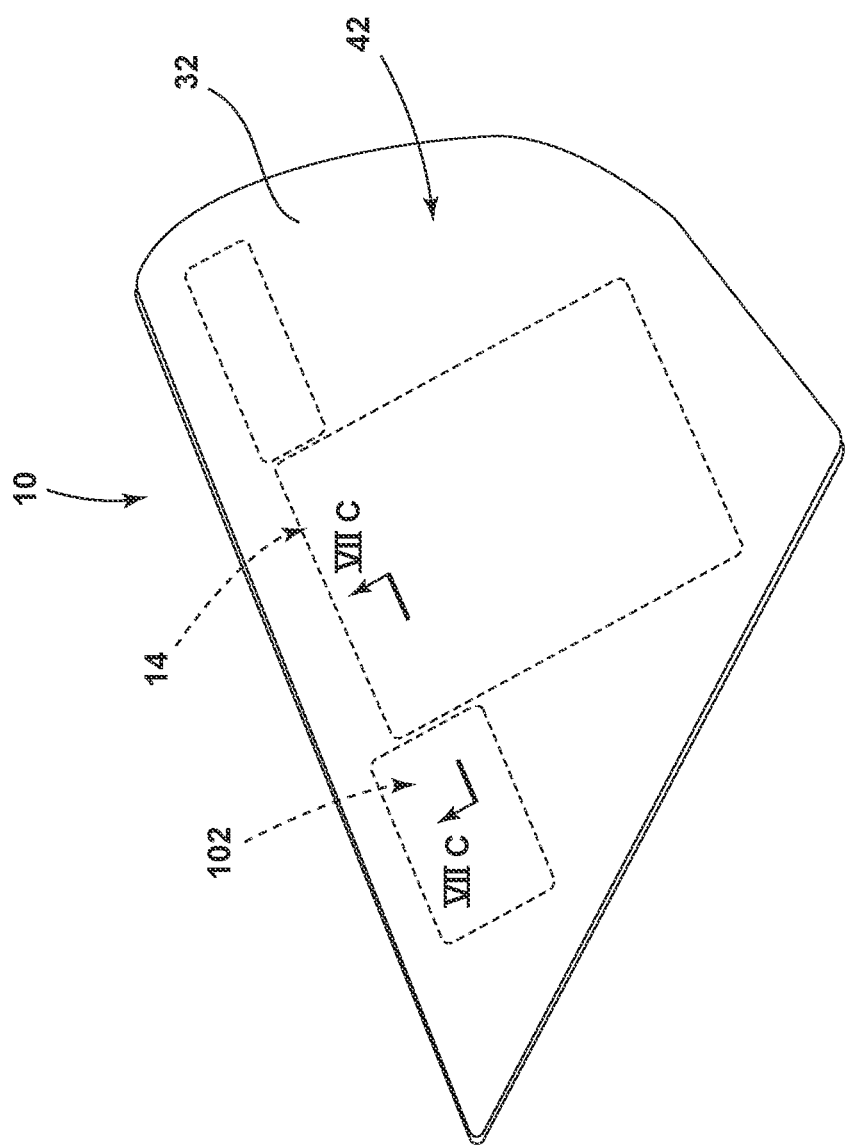
FIG. 7A is a perspective view of the light system including the LED display and the charge port door in accordance with various aspects of the present disclosure.
Figure 7B:
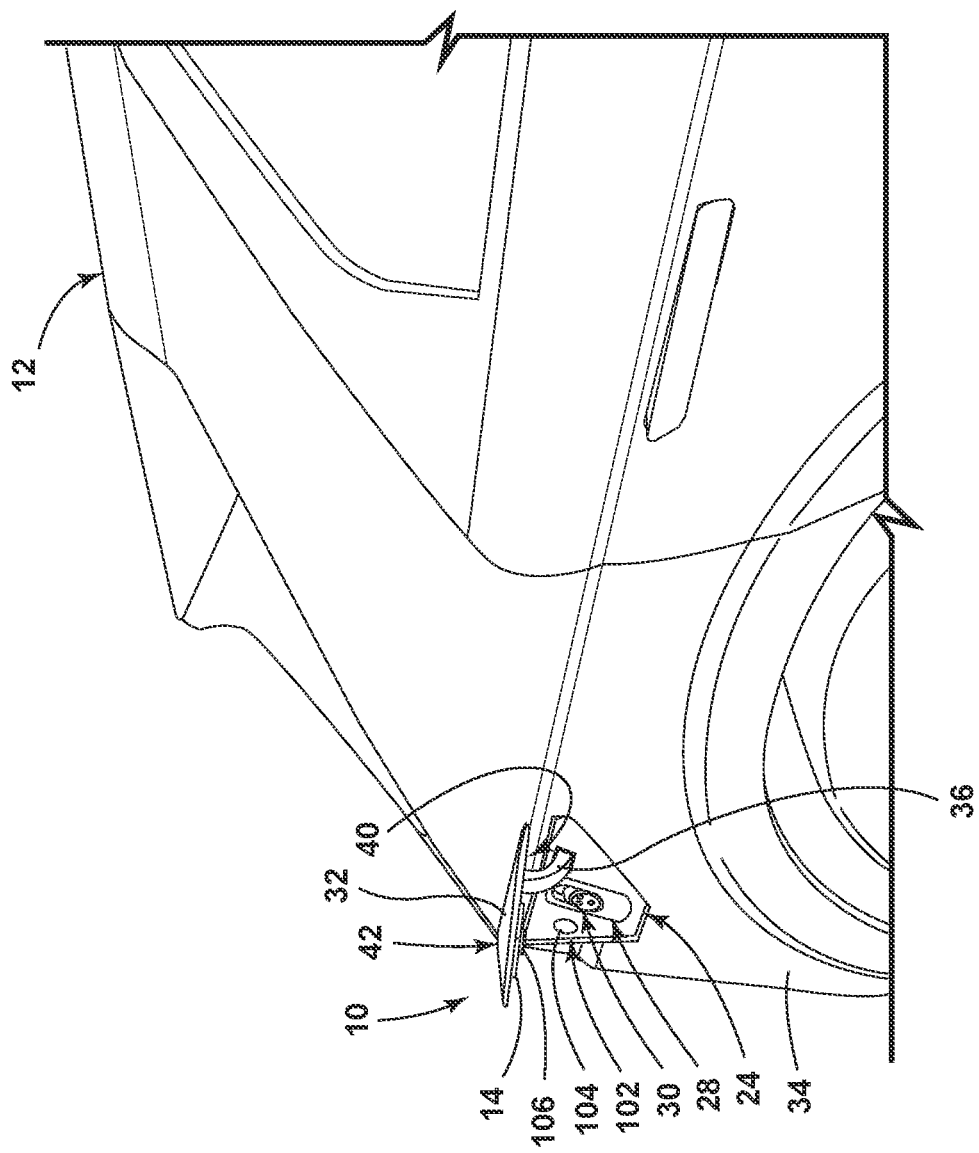
FIG. 7B is a perspective view of the light system including the LED display and the charge port door in accordance with various aspects of the present disclosure.
Figure 7C:
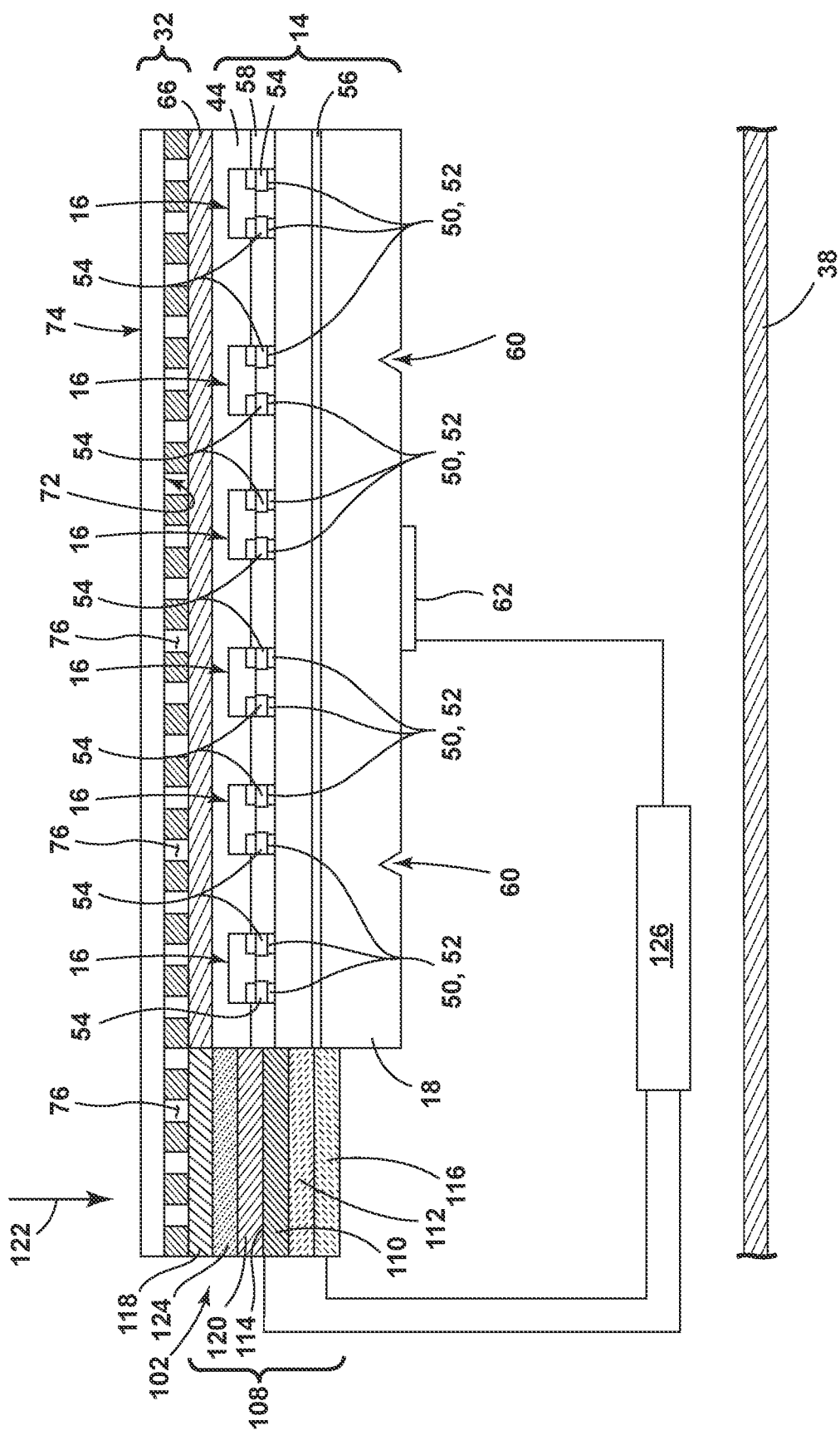
FIG. 7C is a cross-sectional view of the light system taken along the line VIIC-VIIC of FIG. 7B.

Referring now to FIGS. 7A-7C, a power assembly 102 may be operably coupled with the LED display 14 and at least partially supported by the charge port door 32. The power assembly 102 may be configured to transfer power to a power supply 126, such as a battery 26, supported by the charge port door 32. As such, the LED display 14 may be powered with the charge port door 32 in the open position and/or the closed position.

As illustrated in FIG. 7B, the power assembly 102 may include a first portion 104 operably coupled with the support structure 28 and a second portion 106 operably coupled and movable with the charge port door 32. In such instances, the first portion 104 and the second portion 106 may operably couple with one another when the charge port door 32 is in the closed position. In various examples, the first portion 104 may be a socket and the second portion 106 may be a plug that mateably couples with the socket. Additionally or alternatively, the first portion 104 and the second portion 106 may inductively transfer power therebetween.

As shown in FIG. 7C, the power assembly 102 may additionally or alternatively be configured as a solar energy converter. In such instances, an n/p junction photovoltaic cell 108 may be utilized as the solar energy converter. In the illustrated example, the photovoltaic cell 108 includes a plurality of semiconductor layers including an n-type semiconductor 110 and a p-type semiconductor 112. The semiconductor layers including the n/p junction generate an electric current in response to the application of sunlight impinging on the photovoltaic cell 108. Various materials are suitable for usage in the semiconductor layers including single-crystal silicon, multicrystalline silicon, amorphous silicon, multicrystalline silicon thin films, single-crystal silicon thin films, III-V compounds including gallium-arsenide (GaAs), Gallium-Indium-Phosphorus (GaInP), Gallium-Indium-Arsenide (GaInAs), and others. In addition to the semiconductor n/p layers, the photovoltaic cell 108 includes a top metallic grip 114 or another electrical contact for collecting electric current from the cell and transferring electric current to the power supply 126. A back contact layer 116 is included to complete the electrical circuit. On the top surface of the complete cell, an encapsulant 118 seals the cell. An anti-reflective coating 120 may be positioned on a top surface of the photovoltaic cell 108 to prevent light 122 from reflecting away from the photovoltaic cell 108. An adhesive layer 124 can affix the photovoltaic cell 108 to the charge port door 32. In some cases, a portion of the charge port door 32 that aligns with the photovoltaic cell 108 may include a higher concentration of channels 76 than a portion of the charge port door 32 that aligns with the LED display 14, or vice versa. The photovoltaic cell may also be used in tandem with energy storage through solid state or chemical battery methods to store energy from light harvesting opportunities for functional activities at dusk and night. Through the use of the highly efficient direct LED display 14 provided herein, the direct LED display 14 can utilize more than 80% of the light produced as back panel light guides, polarizers, BEF layers, color filters, and liquid crystal spatial light modulators are not necessary. Comparatively, a typical LCD display may only produce 5% of useable light for readable display function.

Figure 8:
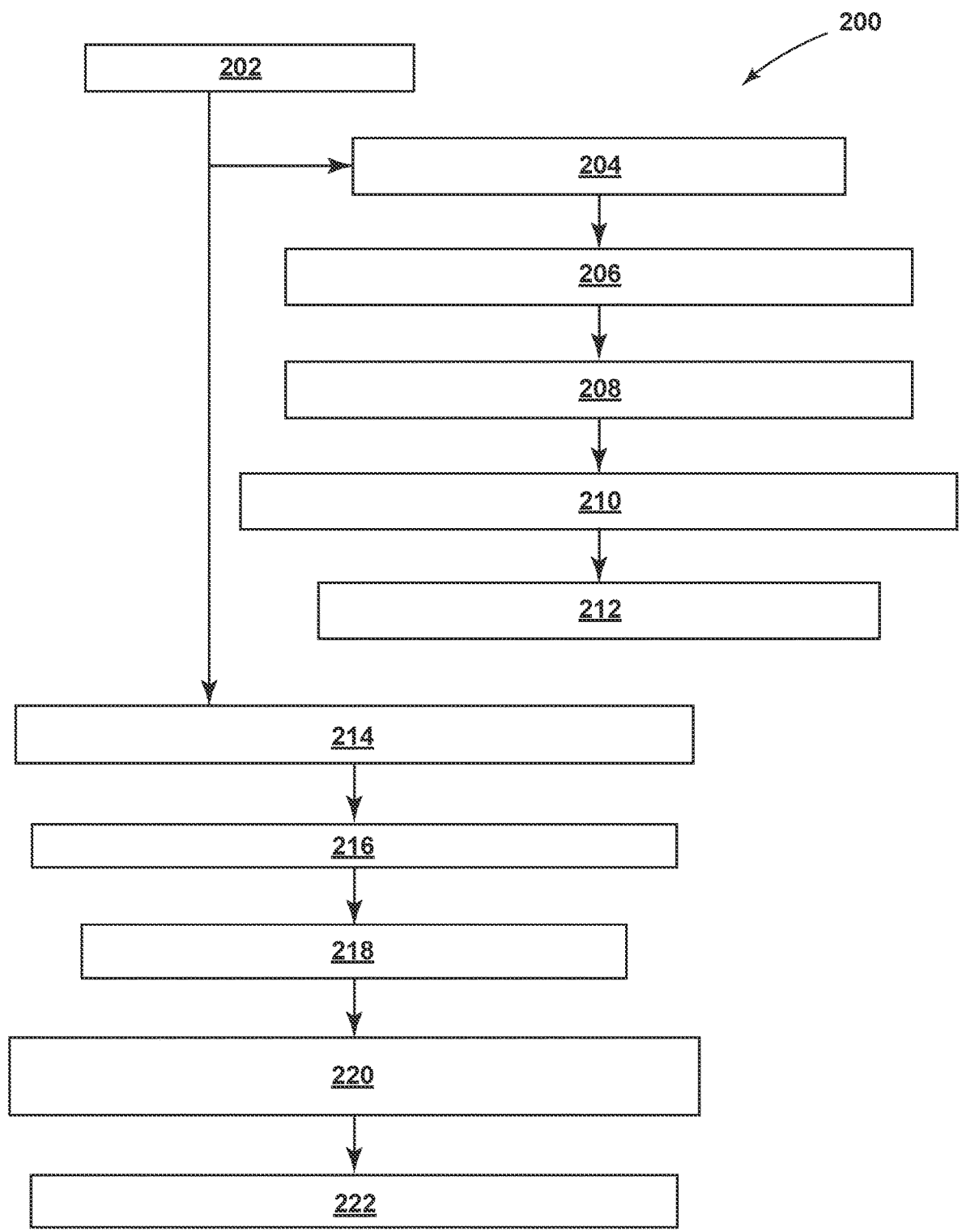
FIG. 8 depicts a method for manufacturing a LED display in accordance with various aspects of the present disclosure.

Now referring to FIGS. 8, a method for manufacturing a vehicle light system is provided in accordance with aspects of the present subject matter. In general, the method 200 will be described herein with reference to the LED display and charge port door described herein. However, it will be appreciated that the disclosed method 200 may be implemented with lighting systems having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, the method 200, at (202) can include producing an LED display. As provided herein, the LED display can be positioned on an external portion (or an internal portion) of the vehicle and flexed in one or more axes. In some instances, the LED display can produce graphics, safety signaling, and/or pictograms for messaging.

In some instances, producing an LED display can include, at (204), producing a flexible circuit board substrate. As provided herein, the substrate can be manufactured from a glass-reinforced epoxy laminate material (e.g., FR4), an insulated metal substrate (IMS), a woven glass fabric surface, and a non-woven glass core combined with epoxy synthetic resin (e.g., CEM-1, CEM-2, CEM-3, CEM-4, and/or CEM-5), a glass material, or any other practicable material. In some instances, producing a flexible circuit board substrate may further include scoring (e.g., v-scoring) one or more surfaces of the substrate to further enhance the flexibility of the substrate.

Additionally, in some cases, producing the flexible circuit board substrate can further include forming a PCB stack of at least two substrate layers with a conductive material positioned therebetween. Additionally or alternatively, producing the flexible circuit board substrate can further include forming one or more thermal vias through the PCB stack. Additionally or alternatively, producing the flexible circuit board substrate can further include positioning an interconnect through at least one of the one or more thermal vias. Additionally or alternatively, producing the flexible circuit board substrate can further include positioning a filler material within the at least one of the one or more thermal vias.

At (206), producing an LED display can include forming a dielectric layer on the circuit board substrate. In addition, at (208), producing an LED display can include disposing one or more traces on the dielectric layer.

At (210), producing an LED display can include electrically coupling an LED flip chip to the one or more traces. In some examples, the LED chip may be an LED flip chip with both a first electrode and a second electrode positioned on a common side of the LED chip on a surface facing away from the light extraction surface. As such, the LED chips may be bonded to the traces. Additionally or alternatively, in various examples, the LED chip may include an array of LEDs that are configured to emit varied colors of light for an RGBW (red, green, blue, and white) LED chip, an RGB LED chip, a white LED chip and/or any other assortment of LEDs.

At (212), producing an LED display can include optically coupling an optic with the led flip chip. In various examples, each of the optics may be formed independently and/or in combination. Moreover, the optics may be flexible or capable of elastic deformation and formed from a polymerizable compound, a mold in clear (MIC) material, a mold in white (MIW) material, and/or any other material. Such flexible materials can include urethanes, silicone, thermoplastic polyurethane (TPU), or other optical-grade flexible materials. In some cases, each LED chip may be configured to emit light about a focal axis. Additionally or alternatively, the optic can be optically coupled with the LED chip and can define an optical axis. In some instances, the optical axis and the focal axis maintain a generally aligned position when the circuit board is positioned in a non-planar orientation.

At (214), the method 200 can include operably coupling an intermediate layer to the LED display. As provided herein, the intermediate layer may be configured as a light-altering layer, which may be in the form of a diffuser, a light filter, a tint, and/or any other material.

At (216), the method 200 can include disposing a decorative layer on a surface of a panel. In various examples, the decorative layer and the panel may form a vehicle charge port door or another panel that may be installed on the vehicle.

At (218), the method 200 can include forming channels through the decorative layer. In some instances, the decorative layer may be positioned on the B-side of the panel and the channels may be formed through a laser-based coating removal process that uses pulses of light from high-power lasers to ablate or vaporize the decorative layer from the panel.

At (220), the method 200 can include operably coupling the charge port door to an opposing side of the intermediate layer from the LED display. As such, once installed, the LED display may be configured to produce graphics, safety signaling, and/or pictograms for messaging that is transmitted through the channels to be visible from the A-side side of the panel. However, when unilluminated, the LED display may be generally concealed from view when viewed from the A-side side of the panel.

At (222), the method 200 can include operably coupling a power assembly to the LED display. In some cases, the power assembly includes a photovoltaic cell positioned on an opposing side of the decorative layer from the panel. Additionally or alternatively, the power assembly can include a first portion operably coupled with the support structure and a second portion operably coupled and movable with the charge port door. In such instances, the first portion and the second portion may operably couple with one another when the charge port door is in the closed position. In various examples, the first portion may be a socket and the second portion may be a plug that mateably couples with the socket. Additionally or alternatively, the first portion and the second portion may inductively transfer power therebetween.

Applications of embodiments in the present disclosure can be applied in numerous applications and industries. For example, as noted above, the present disclosure could be used in automotive lighting systems. The lighting system may also be implemented in other transportation industries, such as unmanned vehicles, drones, hoverboards, mopeds, bicycles, motorcycles, or other mobile apparatuses. Similarly, the present disclosure may alternatively be implemented in any other illuminable device, such as branding notifications, safety notifications, protocols, and/or messages. For example, storefronts, houses, billboards, or any marketing surface can utilize the lighting system disclosed herein.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, or a human-understandable form, such as source code, which may be compiled to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A vehicle light system comprising:
   an LED display;
   an intermediate layer positioned along the LED display; and
   a vehicle charge port door movable between an open position and a closed position, the vehicle charge port door including a panel and a decorative layer, the decorative layer positioned between the intermediate layer and the panel, and wherein the decorative layer defines one or more channels therethrough, and wherein light emitted from the LED display is configured to be emitted through the vehicle charge port door in the open position and the closed position.

2. The vehicle light system of claim 1, wherein the LED display comprises:
   an LED chip configured to emit light about a focal axis; and
   a circuit board configured to selectively electrify the LED chip, wherein the circuit board is elastically deformable.

3. The vehicle light system of claim 2, wherein the LED chip is a flip chip having both a first electrode and a second electrode positioned on a common side of the LED chip.

4. The vehicle light system of claim 1, further comprising:
   a protection layer positioned on the LED display.

5. The vehicle light system of claim 2, wherein the LED display further comprises an optic optically coupled with the LED chip and defining an optical axis, wherein the optic is elastically deformable.

6. The vehicle light system of claim 5, wherein the optical axis and the focal axis maintain a generally aligned position when the circuit board is positioned in a non-planar orientation.

7. The vehicle light system of claim 1, wherein the LED display emits light through the intermediate layer, the decorative layer, and a B-side of the panel.

8. The vehicle light system of claim 1, wherein the LED display and the intermediate layer each have a non-planar orientation along the vehicle charge port door.

9. The vehicle light system of claim 1, wherein the intermediate layer is configured as at least one of a diffuser, a light filter, or a tint.

10. A method for manufacturing a vehicle light system, the method comprising:
    producing an LED display;
    disposing a decorative layer on a surface of a panel;
    forming one or more channels through the decorative layer;
    operably coupling an opposing side of the decorative layer from the panel to the LED display; and
    operably coupling a power assembly to the LED display, wherein the power assembly includes a photovoltaic cell positioned on the opposing side of the decorative layer from the panel.

11. The method of claim 10, further comprising:
    operably coupling an intermediate layer between the LED display and the decorative layer.

12. The method of claim 10, wherein producing the LED display further comprises:
    producing a flexible circuit board substrate;
    forming a dielectric layer on the flexible circuit board substrate;
    disposing one or more traces on the dielectric layer;
    electrically coupling an LED flip chip to the one or more traces; and
    optically coupling an optic with the LED flip chip.

13. The method of claim 10, wherein the panel forms at least a portion of a vehicle charge port door of a vehicle.

14. A vehicle light system comprising:
an LED display;
an intermediate layer positioned along the LED display;
a decorative layer positioned on an opposing side of the intermediate layer from the LED display, wherein the decorative layer defines one or more channels therethrough;
a light transmissive panel positioned on an opposing side of the decorative layer from the intermediate layer;
a power assembly operably coupled with the LED display, the power assembly including a first portion operably coupled with a support structure and a second portion operably coupled with the light transmissive panel, wherein the second portion is configured to operably couple with the first portion in a first position and move with the light transmissive panel to a second position, and wherein the first portion is separated from the second portion when the light transmissive panel is in the second position; and
a power supply operably coupled with the power assembly and configured to power the LED display.

15. The vehicle light system of claim 14, wherein the decorative layer and the light transmissive panel form an exterior vehicle panel.

16. The vehicle light system of claim 15, wherein the exterior vehicle panel is configured to move between an open position and a closed position.

17. The vehicle light system of claim 14, wherein the power assembly includes a photovoltaic cell positioned on an opposing side of the decorative layer from the light transmissive panel.

* * * * *